US010385969B2

(12) United States Patent
Kokubu et al.

(10) Patent No.: US 10,385,969 B2
(45) Date of Patent: Aug. 20, 2019

(54) MAGNETIC LOCK DEVICE AND PARKING DEVICE

(71) Applicant: AISIN AW CO., LTD., Anjo-shi, Aichi-ken (JP)

(72) Inventors: Takahiro Kokubu, Nishio (JP); Masaya Nakai, Tokoname (JP)

(73) Assignee: AISIN AW CO., LTD., Anjo-shi, Aichi (JP)

( * ) Notice: Subject to any disclaimer, the term of this patent is extended or adjusted under 35 U.S.C. 154(b) by 283 days.

(21) Appl. No.: 15/328,128

(22) PCT Filed: Aug. 12, 2015

(86) PCT No.: PCT/JP2015/072821
§ 371 (c)(1),
(2) Date: Jan. 23, 2017

(87) PCT Pub. No.: WO2016/031575
PCT Pub. Date: Mar. 3, 2016

(65) Prior Publication Data
US 2017/0219098 A1    Aug. 3, 2017

(30) Foreign Application Priority Data

Aug. 29, 2014 (JP) ................. 2014-176391
Aug. 29, 2014 (JP) ................. 2014-176392

(51) Int. Cl.
*F16H 63/34* (2006.01)
*B60T 1/00* (2006.01)
(Continued)

(52) U.S. Cl.
CPC .......... *F16H 63/3433* (2013.01); *B60T 1/005* (2013.01); *B60T 1/062* (2013.01);
(Continued)

(58) Field of Classification Search
CPC .. F16H 2306/32; F16H 63/3491; F16H 63/32; F16H 63/3416; F16H 63/3433;
(Continued)

(56) References Cited

U.S. PATENT DOCUMENTS

2008/0236967 A1    10/2008  Mayr
2011/0198190 A1*   8/2011   Steinhauser ........ F16H 63/3491
                                                    192/219.5
(Continued)

FOREIGN PATENT DOCUMENTS

CN    105593579 A    5/2016
JP    2000-272369 A  10/2000
(Continued)

OTHER PUBLICATIONS

International Search Report for PCT/JP2015/072821 dated Nov. 17, 2015 [PCT/ISA/210].
(Continued)

*Primary Examiner* — Charles A Fox
*Assistant Examiner* — Lillian T Nguyen
(74) *Attorney, Agent, or Firm* — Sughrue Mion, PLLC

(57) ABSTRACT

A magnetic lock device includes a lock shaft having an abutting portion capable of abutting against a roller of a piston rod of a hydraulic pressure actuator, a transfer shaft configured separately from the lock shaft, the transfer shaft abutting against an end surface of the lock shaft, and a magnetic portion locking (restricting movement to the right side in the drawing) the lock shaft, the transfer shaft, and a plunger by attracting the plunger toward an attracting portion using a magnetic force. The lock shaft is surface-hardened to have a higher hardness and the transfer shaft is made of non-magnetic material.

19 Claims, 12 Drawing Sheets

(51) Int. Cl.
 *B60T 1/06* (2006.01)
 *F16D 63/00* (2006.01)
(52) U.S. Cl.
 CPC ....... *F16D 63/006* (2013.01); *F16H 63/3475* (2013.01); *F16H 63/3483* (2013.01)
(58) Field of Classification Search
 CPC ............. F16H 63/3475; F16H 63/3483; F16D 2127/06; F16D 2127/002; F16D 63/006; B60T 1/005; B60T 1/062
 See application file for complete search history.

(56) References Cited

U.S. PATENT DOCUMENTS

| | | |
|---|---|---|
| 2014/0123799 A1 | 5/2014 | Landino et al. |
| 2016/0091037 A1 | 3/2016 | Iwata et al. |
| 2016/0123412 A1 | 5/2016 | Iwata et al. |
| 2016/0208916 A1* | 7/2016 | Kokubu ................... B60T 1/005 |

FOREIGN PATENT DOCUMENTS

| | | | |
|---|---|---|---|
| JP | 2008-128444 A | 6/2008 | |
| JP | 2009-063006 A | 3/2009 | |
| JP | 2009-520163 A | 5/2009 | |
| JP | 2010-143326 A | 7/2010 | |
| WO | WO-2015060412 A1 * | 4/2015 | .............. B60T 1/005 |

OTHER PUBLICATIONS

Written Opinion for PCT/JP2015/072821 dated Nov. 17, 2015 [PCT/ISA/210].

* cited by examiner

MAGNETIC LOCK DEVICE AND PARKING DEVICE

CROSS REFERENCE TO RELATED APPLICATIONS

This application is a National Stage of International Application No. PCT/JP2015/072821 filed Aug. 12, 2015, claiming priority based on Japanese Patent Application Nos. 2014-176391 filed Aug. 29, 2014 and 2014-176392 filed Aug. 29, 2014, the contents of all of which are incorporated herein by reference in their entirety.

TECHNICAL FIELD

The present disclosure relates to a magnetic lock device and a parking device.

BACKGROUND ART

Conventionally, there is a known parking device including a parking rod performing engagement and disengagement between a parking pawl and a parking gear by moving in the axial direction, a parking lock spring biasing the parking rod to the side in the axial direction (of the parking rod) that engages (forms a parking lock state) the parking pawl with the parking gear, a hydraulic cylinder moving the parking rod to the side in the axial direction (of the parking rod) that releases (forms a parking release state) the parking pawl from the parking gear, and a holding solenoid that blocks the movement in the axial direction of the parking rod (see PTL 1, for example).

In the parking device, the holding solenoid has a movable element moving in a direction orthogonal to the axial direction of the parking rod. The movable element is locked by a magnetic force so that the movement in the axial direction of the parking rod is restricted by engagement between the roller supported by the movable element and the concave portion formed in the parking rod. Accordingly, the parking release state can be kept by locking the movable element using a magnetic force in the parking release state.

CITATION LIST

Patent Literature

PTL 1: JP-A-2008-128444

SUMMARY OF INVENTION

In the parking device described above, when the parking release state is kept by the engagement between the roller supported by the movable element and the concave portion formed in the parking rod, a load in a direction orthogonal to the movement direction of the movable element (the movement direction of the parking rod) is applied to the movable element. Therefore, it is important to improve the strength (hardness) of the part of the movable element to which a force is applied from the parking rod via the roller. On the other hand, the movable element is preferably made of non-magnetic material to improve the magnetic efficiency of the holding solenoid. In this case, however, it is impossible to perform surface effect treatment for hardening at least the surface of the movable element, such as quenching. Accordingly, it is necessary to improve the strength of the part of the movable element to which a force is applied from the parking rod via the roller and improve the magnetic efficiency of the holding solenoid at the same time.

A main object of the magnetic lock device and parking device according to the disclosure is to improve the durability of a movement restricting member of a magnetic lock device that restricts the movement of a moving member reciprocating in a first direction using a magnetic force and improve the magnetic efficiency of the magnetic lock device at the same time.

The magnetic lock device and parking device according to the disclosure take the following measures to achieve the main object described above.

According to the disclosure, there is provided a magnetic lock device including an abutting portion capable of abutting against an abutted portion provided on a moving member reciprocating in a first direction and a movement restricting member reciprocating in a second direction orthogonal to the first direction, in which the movement restricting member is locked by a magnetic force so as to restrict movement of the moving member in the first direction by abutting the abutting portion and the abutted portion, the magnetic lock device including a magnetic portion including a plunger that is made of a magnetic material and reciprocates in the second direction, and an attracting portion attracting the plunger toward the moving member using a magnetic force and locking the plunger and a bearing slidably supporting the movement restricting member, in which the movement restricting member includes a first member having the abutting portion and a second member formed separately from the first member, the first member, the second member, and the plunger are disposed in this order in the second direction from the moving member, the first member supported by the bearing is surface-hardened for hardening at least a surface of the first member, and the second member is made of non-magnetic material.

In the magnetic lock device according to the disclosure, the movement restricting member includes the first member having the abutting portion and the second member formed separately from the first member, in which the first member, the second member, and the plunger are disposed in this order in the second direction from the moving member. In addition, the first member supported by the bearing is surface-hardened for hardening at least the surface of the first member, and the second member is made of non-magnetic material.

This device restricts the movement in the second direction of the first member, the second member, and the plunger by attracting the plunger toward the moving member using the attracting portion via a magnetic force and locking the plunger and restricts the movement in the first direction of the moving member when the abutted portion of the moving member abuts against the abutting portion of the first member of the movement restricting member.

Since the first member is surface-hardened, it is possible to suppress deformation (such as concave portion of the surface) of the first member due to a force given from the bearing and a force applied from the abutted portion to the abutting portion when the abutted portion abuts against the abutting portion, thereby improving the durability of the first member. When the abutted portion abuts against the abutting portion, a force in a direction different from the movement direction of the first member and the second member is applied from the abutted portion to the abutting portion.

Accordingly, a larger force may be applied from the bearing to the first member than in the case in which the abutted portion does not abut against the abutting portion. Accordingly, it is important to improve the hardness of the first member against the abutment between the abutted portion and the abutting portion. "Surface-hardening" is, for example, quenching. In addition, since the second member is made of non-magnetic material, it is possible to prevent magnetic flux leakage due to the second member and improve the magnetic efficiency of the magnetic lock device. As a result, it is possible to improve the durability of the first member of the magnetic lock device and improve the magnetic efficiency of the magnetic lock device at the same time.

The parking device according to the disclosure has the magnetic lock device according to any one of the above aspects of the disclosure in which the rotary shaft of the transmission is locked or the locked rotary shaft is released by reciprocation in the first direction of the moving member, in which the moving member is moved in the first direction to a lock side for locking the rotary shaft or a lock release side for releasing the locked rotary shaft by the elastic force of the second elastic member or a hydraulic pressure.

The parking device according to the disclosure includes the magnetic lock device according to any one of the above aspects of the disclosure. Accordingly, it is possible to obtain the same effect as in the magnetic lock device according to the disclosure, such as, for example, the effect of improving the durability of the first member of the magnetic lock device and improving the magnetic efficiency of the magnetic lock device at the same time. The moving member and the movement restricting member are disposed so that the moving member and the movement restricting member are moved in directions orthogonal to each other. This facilitates disposition in a restricted space as compared with the case in which both members are disposed (in a single shaft line) so as to move in a single direction.

DESCRIPTION OF EMBODIMENTS

Next, an embodiment of the disclosure will be described with reference to the drawings.

Figure 1:
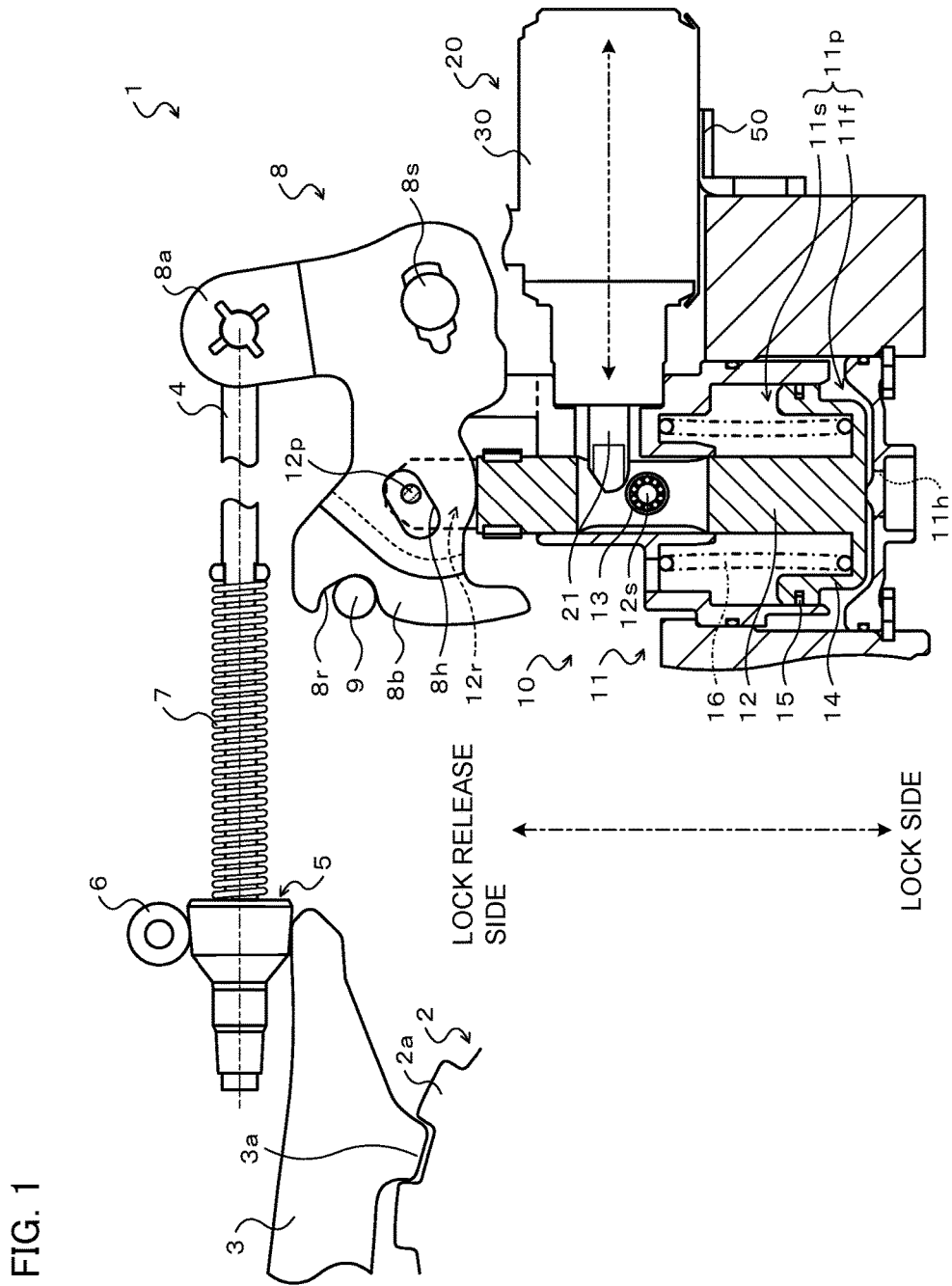
FIG. 1 is a structural diagram schematically illustrating the structure of a parking device 1 according to an embodiment of the disclosure.
Figure 2:
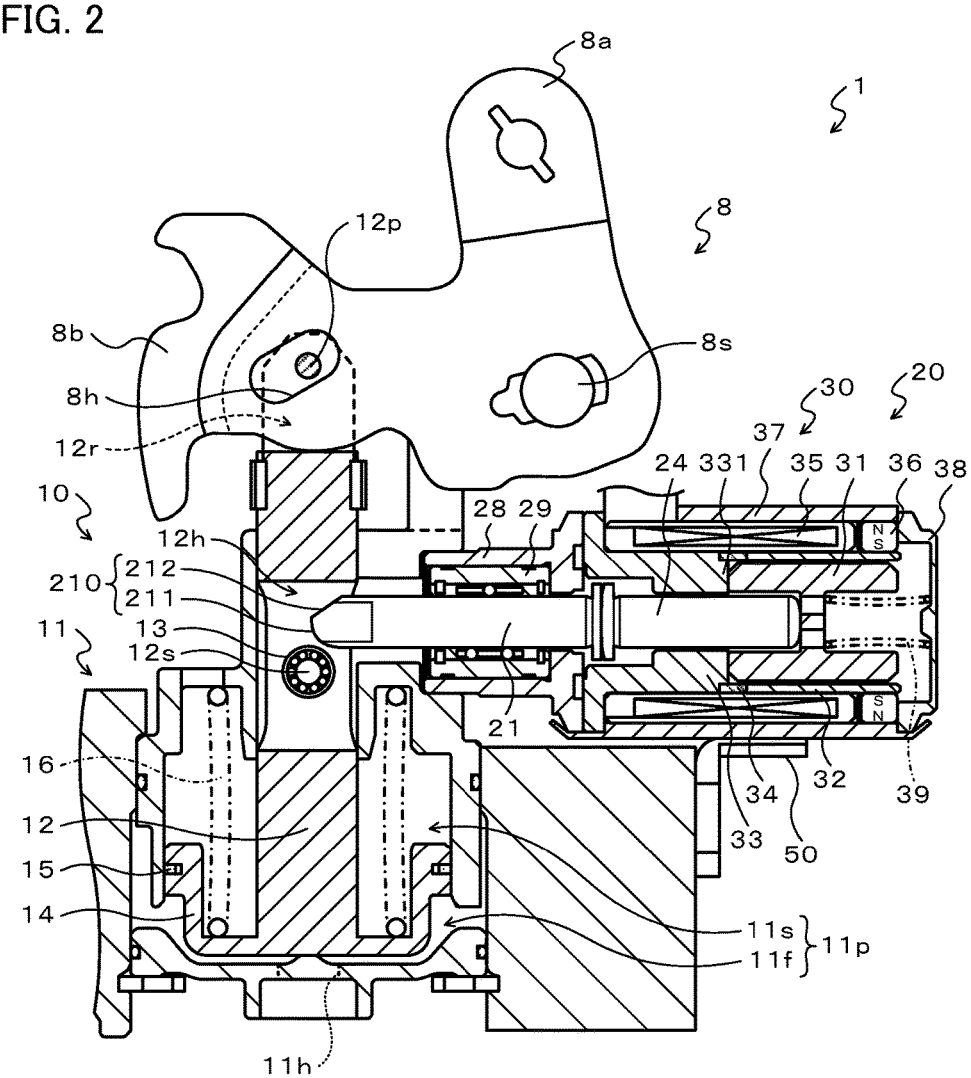
FIG. 2 is a structural diagram schematically illustrating the structure of the main part of the parking device 1.
Figure 3:
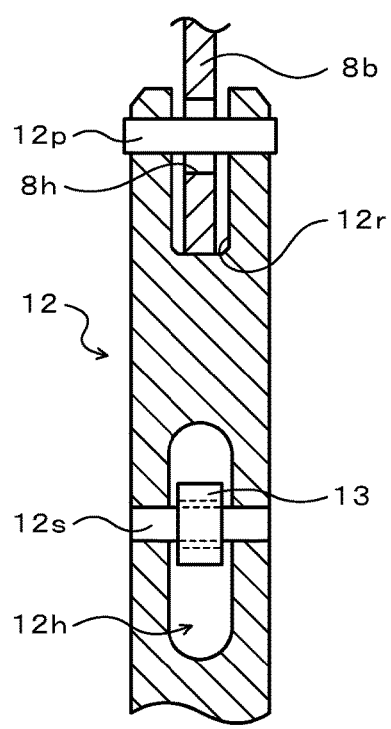
FIG. 3 is a structural diagram schematically illustrating the structure of a part of a hydraulic pressure actuator 10.
Figure 4:
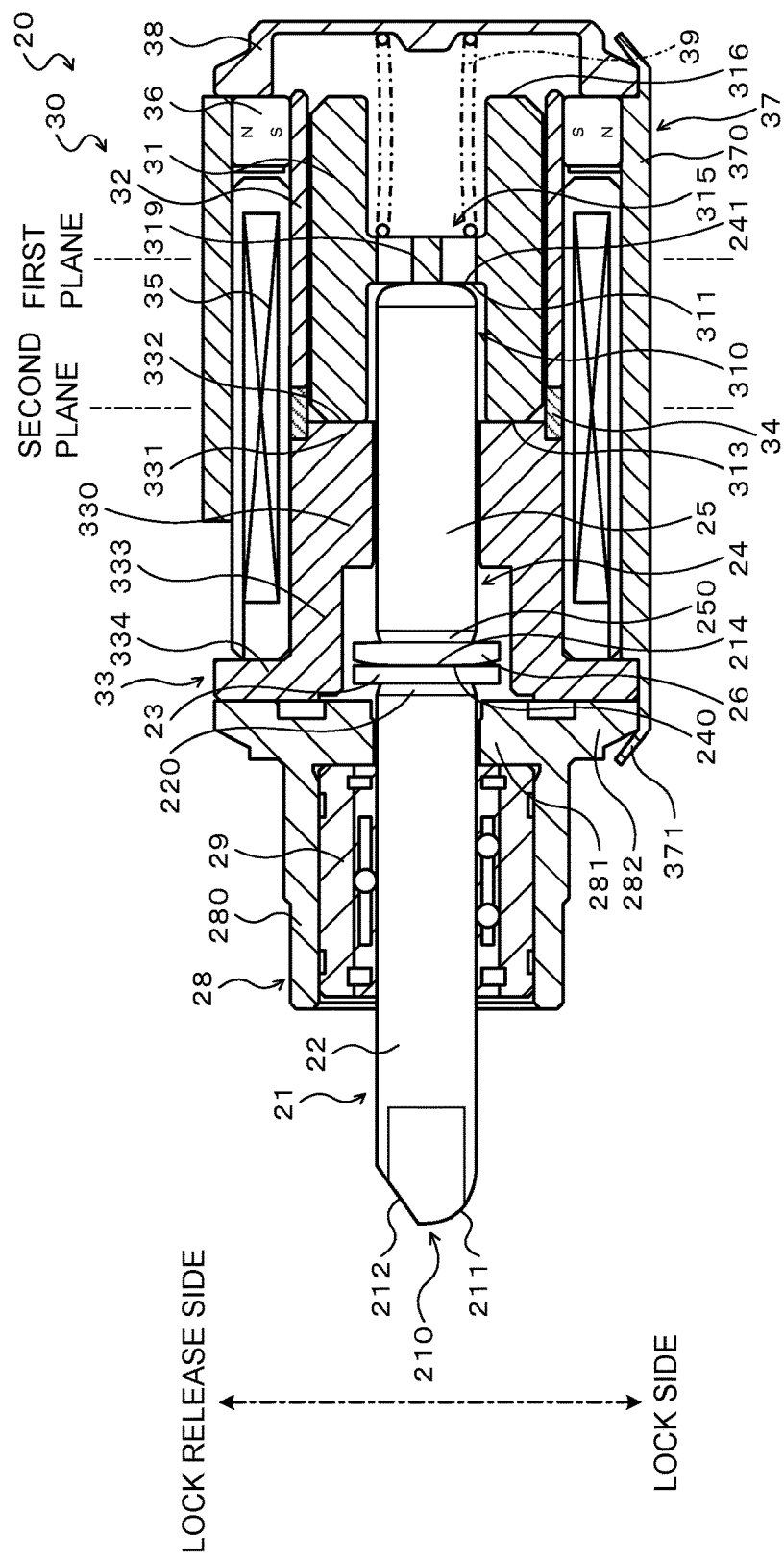
FIG. 4 is a structural diagram schematically illustrating the structure of a magnetic lock device 20.

FIG. 1 is a structural diagram schematically illustrating the structure of the parking device 1 according to the embodiment of the disclosure, FIG. 2 is a structural diagram schematically illustrating the structure of the main part of the parking device 1, FIG. 3 is a structural diagram schematically illustrating the structure of a part of the hydraulic pressure actuator 10, and FIG. 4 is a structural diagram schematically illustrating the structure of the magnetic lock device 20.

The parking device 1 according to the embodiment is mounted in a vehicle and disposed inside or outside the transmission case of a transmission (not illustrated). This parking device 1 is configured as a so-called shift-by-wire parking device that locks any one of rotary shafts of the transmission based on an electric signal output according to the operation position (shift range) of a shift lever and releases the locked rotary shaft.

As illustrated in FIG. 1, the parking device 1 includes a parking gear 2 having a plurality of teeth 2a and attached to any one of rotary shafts of the transmission, a parking pawl 3 having a projecting portion 3a capable of being engaged with the parking gear 2, the parking pawl 3 being biased by a spring (not illustrated) so as to be distant from the parking gear 2, a parking rod 4 capable of reciprocating, a tubular cam member 5 movable in the axial direction of the parking rod 4, a supporting roller 6 rotatably supported by, for example, the transmission case and holding the cam member 5 together with the parking pawl 3, a cam spring 7 having one end supported by the parking rod 4 and biasing the cam member 5 so as to push the parking pawl 3 against the parking gear 2, a detent lever 8 coupled to the parking rod 4, the hydraulic pressure actuator 10 reciprocating the parking rod 4 via the detent lever 8 by reciprocation of a piston rod 12 as a moving member, and the magnetic lock device 20 restricting the reciprocation of the parking rod 4 by restricting the reciprocation of the piston rod 12. In the parking device 1, as illustrated in the drawing, the projecting portion 3a of the parking pawl 3 is engaged with the concave portion between the two adjacent teeth 2a of the parking gear 2 to lock (parking lock) the rotary shafts of the transmission.

The parking gear 2, the parking pawl 3, the parking rod 4, the cam member 5, the supporting roller 6, and the cam spring 7 have well-known structures. The detent lever 8 is substantially L-shaped and has a first free end portion 8a and a second free end portion 8b. The first free end portion 8a is rotatably coupled to the base end portion (right end portion in FIG. 1) of the parking rod 4. The second free end portion 8b is provided with an engagement concave portion 8r that can be engaged with an engagement member 9 attached to a detent spring (not illustrated) supported by, for example, the transmission case. The corner portions (the base end portions of the first free end portion 8a and the second free end portion 8b) of the detent lever 8 are pivotably supported by a spindle 8s supported by, for example, the transmission case.

The hydraulic pressure actuator 10 is configured to be operated by a hydraulic pressure from the hydraulic pressure control device of the transmission controlled by an electronic control device based on an electric signal output according to the operation position (shift range) of the shift lever. As illustrated in FIG. 2, this hydraulic pressure actuator 10 includes a case 11 having a plurality of members, the piston rod 12, coupled to the second free end portion 8b of the detent lever 8, that is supported movably in the axial direction (up-down direction (first direction) in FIG. 2) by the case 11, and a piston 14, molded integrally with the piston rod 12, that is disposed in a piston chamber 11p formed in the case 11.

The piston rod 12 is supported by the case 11 so that its end portion (upper end portion in FIG. 2) projects to the outside (upper side in FIG. 2) from the case 11. As illustrated in FIG. 3, a coupling concave portion 12r extending from the end to the base end side is formed in the end portion of the piston rod 12 and the second free end portion 8b of the detent lever 8 is inserted into the coupling concave portion 12r. A long hole 8h is formed in the detent lever 8 so as to be positioned in the coupling concave portion 12r and a coupling pin 12p supported by the end portion of the piston rod 12 penetrates through the long hole 8h. The long hole 8h is formed so that a space is defined between its inner circumference and the outer circumferential surface of the coupling pin 12p. Accordingly, the piston rod 12 and the detent lever 8 are coupled to each other so as to be relatively movable to some extent.

In addition, a hole 12h penetrating through the piston rod 12 in a direction (left-right direction in FIG. 2) orthogonal to the axial direction of the piston rod 12 and extending in the axial direction is formed in the vicinity of the middle in the axial direction (up-down direction in FIG. 2) of the piston rod 12 and a roller 13 as the abutted portion is disposed inside the hole 12h. The roller 13 is configured as a roller bearing and has an outer diameter smaller than the length in the longitudinal direction (up-down direction in FIG. 2 and FIG. 3) of the hole 12h. The roller 13 is supported rotatably inside the hole 12h by a support shaft 12s supported by the piston rod 12 so as to extend parallel to the coupling pin 12p.

The piston 14 is molded integrally with the piston rod 12 in the base end portion (lower end portion in FIG. 2) of the piston rod 12 and supported movably in the axial direction of the piston rod 12 by the inner wall surface of the piston chamber 11p via a seal member 15. The piston 14 partitions the inside of the piston chamber 11p into an oil chamber 11f and a spring chamber 11s. The oil chamber 11f is defined on the lower side in FIG. 2 of the piston 14 in the piston chamber 11p and communicates with an oil hole 11h formed in the case 11. A hydraulic pressure (working oil) from the hydraulic pressure control device is supplied into the oil chamber 11f via an oil path (not illustrated) and the oil hole 11h. The spring chamber 11s is defined on the upper side in FIG. 2 of the piston 14 in the piston chamber 11p. A return spring 16 as an elastic member is disposed in the part of the spring chamber 11s between the case 11 and the piston 14 and the piston 14 is biased by the return spring 16 toward the oil chamber 11f (lower side in FIG. 2) from the spring chamber 11s.

In the hydraulic pressure actuator 10 configured in this way, in the assembly state (the state in which assembly is completed), the piston 14 is biased to the lower side in FIG. 1 by the return spring 16, comes closest to or abuts against the bottom of the oil chamber 11f, and the amount of projection of the piston rod 12 from the case 11 becomes minimum. Accordingly, the parking rod 4 coupled to the piston rod 12 via the detent lever 8 comes closest to the base end portion of the parking pawl 3, the parking pawl 3 is pushed so as to be engaged with the parking gear 2 by the cam member 5 biased by the cam spring 7, and the rotary shaft of the transmission is locked (parking lock is made).

When the hydraulic pressure from the hydraulic pressure control device is supplied to the oil chamber 11f of the hydraulic pressure actuator 10 in the state (referred to below as the "parking lock state" as appropriate) in which the rotary shaft of the transmission is locked as illustrated in FIG. 1, the piston rod 12 is moved by the hydraulic pressure in the oil chamber 11f to the upper side (referred to below as the "lock release side" as appropriate) in FIG. 1 in the movement direction (first direction) of the piston rod 12 by against the elastic force (biasing force) of the return spring 16. This pivots the detent lever 8 clockwise in FIG. 1 about the spindle 8s and moves the parking rod 4 to the right side in FIG. 1. When the parking rod 4 is moved to the right side in FIG. 1, the depression of the parking pawl 3 by the cam member 5 is released and the engagement (that is, the locked rotary shaft of the transmission) between the parking gear 2 and the parking pawl 3 is released (the parking lock is released). Accordingly, when the hydraulic pressure from the hydraulic pressure control device is supplied to the oil chamber 11f of the hydraulic pressure actuator 10 while the vehicle travels, the rotary shaft of the transmission is not locked (parking lock is not made).

In addition, in the state (referred to below as the "parking lock release state" as appropriate) in which the parking lock is released, when the supply of the hydraulic pressure from the hydraulic pressure control device to the oil hole 11h stops and the working oil starts flowing out of the oil chamber 11f via the oil hole 11h, the piston rod 12 and the piston 14 are moved to the lower side (referred to below as the "lock side" as appropriate) in FIG. 1 in the movement direction of the piston rod 12 by the elastic force (biasing force) of the return spring 16. This pivots the detent lever 8 counterclockwise in FIG. 1 about the spindle 8s and moves the parking rod 4 to the left side in FIG. 1. When the parking rod 4 is moved to the left side in FIG. 1, the cam member 5 biased by the cam spring 7 pushes the parking pawl 3 so that the parking pawl 3 is engaged with the parking gear 2 and the rotary shaft of the transmission is locked (parking lock is made). When the engagement concave portion 8r of the second free end portion 8b of the detent lever 8 is engaged with the engagement member 9, the pivot of the detent lever 8 about the spindle 8s is restricted to some extent by a detent spring (not illustrated) and the movement of the parking rod 4 is thereby restricted to some extent.

If the hydraulic pressure supplied to the oil chamber 11f of the hydraulic pressure actuator 10 is reduced when the engine of a vehicle and the oil pump driven by the engine stop due to, for example, an idling stop or the like, the magnetic lock device 20 restricts the movement of the piston rod 12 and the piston 14 to the lock side (lower side in FIG. 1) using the elastic force (biasing force) of the return spring 16 so as to prevent a shift from the parking lock release state to the parking lock state.

As illustrated in FIG. 4, the magnetic lock device 20 includes a lock shaft 21 having an abutting portion 210 capable of abutting against the roller 13 (see FIG. 2) as the abutted portion provided on the piston rod 12, the transfer shaft 24, disposed on the right side in FIG. 4 of the lock shaft 21, that abuts against the lock shaft 21, a shaft holder 28 supporting the lock shaft 21 movably in the axial direction (left-right direction (second direction) in FIG. 4), and the magnetic portion 30 holding the shaft holder 28 and locking (restricting movement in the left-right direction in FIG. 4) the lock shaft 21 and the transfer shaft 24 using a magnetic force.

The lock shaft 21 is formed by surface-hardening (such as, for example, quenching) at least the surface of non-magnetic material such as stainless steel or magnetic material such as iron. As illustrated in FIG. 4, the lock shaft 21 includes a small-diameter portion 22 that has one end portion (end portion) provided with the abutting portion 210 and is cylindrical except the vicinity of the abutting portion 210 and a large-diameter portion 23 that extends oppositely to the abutting portion 210 from the small-diameter portion 22, has a diameter larger than in the small-diameter portion 22, and is cylindrical. After non-magnetic material such as stainless steel or magnetic material such as iron is quenched, the material generally becomes magnetic material. In addition, an end surface 214 of the lock shaft 21 close to the transfer shaft 24 (right side in FIG. 4) is a flat surface extending in the axial direction of the lock shaft 21. A tapered portion 220 is formed in the part of the outer circumferential surface of the small-diameter portion 22, the part being in the vicinity of the border between the small-diameter portion 22 and the large-diameter portion 23. In the tapered portion 220, the outer circumferential surface of the small-diameter portion 22 is formed to be tapered (the outer diameter becomes smaller) toward the large-diameter portion 23 from the abutting portion 210.

The abutting portion 210 formed in the end portion of the small-diameter portion 22 is molded to have a width across flat shape. The abutting portion 210 has a first abutting surface 211 positioned on the lock side (lower side in the drawing) in the movement direction (up-down direction in FIG. 4) of the piston rod 12 and a second abutting surface 212 positioned on the lock release side (upper side in the drawing) in the movement direction of the piston rod 12. The first abutting surface 211 is formed to be inclined to the lock side toward the large-diameter portion 23 from the abutting portion 210. Specifically, the first abutting surface 211 is a curved surface that has an arc-shaped cross section, projects to the lock side, and has a curvature radius smaller than the radius (curvature radius) of the outer circumferential surface of a the roller 13. The second abutting surface 212 is formed to be inclined to the lock release side toward the large-diameter portion 23 from the abutting portion 210. Specifically, the second abutting surface 212 is a (flat) oblique surface inclined at a constant angle to the lock release side.

The transfer shaft 24 is made of non-magnetic material such as stainless steel and includes a cylindrical small-diameter portion 25 and a cylindrical large-diameter portion 26 that extends toward the lock shaft 21 from the small-diameter portion 25 and has a diameter larger than the small-diameter portion 25 as illustrated in FIG. 4. An end surface 240 of the transfer shaft 24 close to (left side in FIG. 4) the lock shaft 21 is formed in a spherical surface projecting toward the lock shaft 21. In addition, an end surface 241 of the transfer shaft 24 opposite to (right side in FIG. 4) to the lock shaft 21 is formed in a spherical surface projecting to the right side in FIG. 4. A tapered portion 250 is formed in the part of the outer circumferential surface of the small-diameter portion 25, the part being in the vicinity of the border between the small-diameter portion 25 and the large-diameter portion 26. In the tapered portion 250, the outer circumferential surface of the small-diameter portion 25 is formed to be tapered (the outer diameter becomes smaller) toward the large-diameter portion 26 from the end surface 241 of the small-diameter portion 25.

The shaft holder 28 is made of non-magnetic material such as aluminum and, as illustrated in FIG. 4, includes a cylindrical portion 280 shaped like a hollow cylinder, an annular inside flange portion 281 extending to the radially inner side from the end portion of the cylindrical portion 280 close to the magnetic portion 30 (right side in FIG. 4), and the annular outside flange portion 282 extending to the radially outer side from the end portion of the cylindrical portion 280 close to the magnetic portion 30. The length in the axial direction of the cylindrical portion 280 is set to a value smaller than the length in the axial direction of the small-diameter portion 22 of the lock shaft 21. In addition, the inner diameter of the inside flange portion 281 is set to a value larger than the outer diameter of the small-diameter portion 22 of the lock shaft 21 and smaller than the outer diameter of the large-diameter portion 23 of the lock shaft 21. A linear motion bearing 29 for slidably supporting the outer circumferential surface of the small-diameter portion 22 is fixed to the inside of the shaft holder 28. The linear motion bearing 29 is configured as a well-known linear motion bearing including a hollow cylindrical outer cylinder, a tubular sphere holder that is housed in the outer cylinder and has a plurality of sphere circulation paths, a plurality of spheres disposed in the sphere circulation paths of the tubular sphere holder, and the like. The lock shaft 21 is inserted into the inside flange portion 281 of the shaft holder 28 and the linear motion bearing 29 from the part (right side in FIG. 4) close to the magnetic portion 30 and the periphery of the abutting portion 210 projects to the left side in FIG. 4 from the shaft holder 28 and the linear motion bearing 29. In the embodiment, the lock shaft 21 can be smoothly moved in the axial direction (left-right direction in FIG. 4) while the rattle of the lock shaft 21 is suppressed by supporting the small-diameter portion 22 of the lock shaft 21 using the linear motion bearing 29. In addition, since the outer diameter of the large-diameter portion 23 of the lock shaft 21 is larger than the inner diameter of the inside flange portion 281 of the shaft holder 28, it is possible to prevent the lock shaft 21 or the transfer shaft 24 from getting out of the left side in FIG. 4 from the shaft holder 28.

As illustrated in FIG. 4, the magnetic portion 30 includes a plunger 31 movable in the axial direction (left-right direction in FIG. 4), the first core 32 disposed so as to surround the outer circumference of the plunger 31, the second core 33 disposed so as to surround the outer circumference of the transfer shaft 24 in a position closer to the shaft holder 28 (left side in FIG. 4) than the plunger 31 and the first core 32, a gap member 34 disposed so as to make contact with the first core 32 and the second core 33 in a position between the first core 32 and the second core 33, the coil 35 disposed so as to surround much of the outer circumference of the first core 32, the gap member 34, and the second core 33, the permanent magnet 36 disposed so as to surround the outer circumference of the right end portion in FIG. 4 of the first core 32 on the opposite side (right side in FIG. 4) of the shaft holder 28 with respect to the coil 35, a yoke 37, functioning as a case housing the transfer shaft 24, the plunger 31, the first core 32, the second core 33, the gap member 34, the coil 35, the permanent magnet 36, and the like, the yoke 37, that holds the shaft holder 28, a rear cap 38 mounted so as to hold the right end portions in FIG. 4 of the permanent magnet 36 and the yoke 37, and a spring 39, disposed between the plunger 31 and the rear cap 38, that functions as an elastic member biasing the plunger 31 to the shaft holder 28 using an elastic force.

The plunger 31 has a layer of non-magnetic material on its surface of magnetic material such as iron and is formed in a cylindrical shape. As illustrated in FIG. 4, the plunger 31 includes a concave portion 310 formed in the part close to the shaft holder 28 (left side in FIG. 4) in the axial direction, a flat and annular end surface 313 surrounding the concave portion 310, the concave portion 315 formed on the opposite side of the axial direction of the concave portion 310, and a flat and annular end surface 316 surrounding the concave portion 315. An air hole 319 is formed in the plunger 31 so that the concave portion 310 communicates with the concave portion 315.

The concave portion 310 is formed as a circular hole having a bottom surface 311 and an inner circumferential surface and the transfer shaft 24 is inserted into the concave portion 310 so that the end surface 241 of the transfer shaft 24 close to the plunger 31 (right side in FIG. 4) abuts against the bottom surface 311. The bottom surface 311 of the concave portion 310 is a flat surface extending in a direction orthogonal to the axial direction of the plunger 31. The depth of the concave portion 310 is set to a value smaller than the length in the axial direction of the small-diameter portion 25 of the transfer shaft 24 and the inner diameter of the concave portion 310 is set to a value slightly larger than the outer diameter of the small-diameter portion 25 of the transfer shaft 24 and larger than the inner diameter of an attracting portion 331 (described later) of the second core 33.

In the plunger 31, the concave portion 310 and the concave portion 315 have the same shape and the part close to the transfer shaft 24 and the opposite part are formed symmetrically with respect to a first plane (see FIG. 4), orthogonal to the axial direction, that passes through the middle in the axial direction. Accordingly, when the plunger 31 is disposed in the position illustrated in FIG. 4, the end surface 313 and the end surface 316 may be close to the transfer shaft 24, thereby improving workability.

The first core 32 is made of magnetic material such as iron and shaped like a hollow cylindrical shape having an inner diameter slightly larger than the outer diameter of the plunger 31. Much of the first core 32 close to the shaft holder 28 overlaps with the coil 35 in the radial direction (the direction orthogonal to the axial direction).

The gap member 34 provides a predetermined spacing (magnetic gap in a magnetic circuit) between the first core 32 and the second core 33, is made of non-magnetic material such as copper brazing material to fix the first core 32 and the second core 33 each other, and is formed in an annular shape having an inner diameter and outer diameter identical to those of the first core 32. The gap member 34 is disposed so as to include the second plane (see FIG. 4), orthogonal to the axial direction, that passes through the middle in the axial direction of the coil 35 (see FIG. 4).

The second core 33 is made of magnetic material such as iron and includes a first inner diameter portion 330 shaped like a hollow cylinder, a second inner diameter portion 333 shaped like a hollow cylinder, and an annular flange portion 334. The first inner diameter portion 330 has an inner diameter slightly larger than the outer diameter of the small-diameter portion 25 of the transfer shaft 24, smaller than the outer diameter of the large-diameter portion 26 of the transfer shaft 24, and slightly smaller than the inner diameter of the concave portion 310 of the plunger 31 and an outer diameter identical to that of the first core 32 or the gap member 34. The second inner diameter portion 333 extends toward the shaft holder 28 (left side in FIG. 4) from the first inner diameter portion 330, has an inner diameter larger than the inner diameter of the inner circumferential surface of the first inner diameter portion 330, the outer diameter of the large-diameter portion 23 of the lock shaft 21, and the outer diameter of the large-diameter portion 26 of the transfer shaft 24 and an outer diameter identical to that of the first inner diameter portion 330. The annular flange portion 334 extends to the radially outer side from the end portion of the second inner diameter portion 333 close to the shaft holder 28. The first inner diameter portion 330 and the part of the second inner diameter portion 333 closer to the first inner diameter portion 330 than the flange portion 334 overlap with the coil 35 in the radial direction. The end surface of the second core 33 close to the shaft holder 28 (left side in FIG. 4) abuts against the end surface of the shaft holder 28 close to the second core 33 (right side in FIG. 4).

A clearance for allowing the transfer shaft 24 to slide in the axial direction is formed between the inner circumference of the first inner diameter portion 330 of the second core 33 and the outer circumference of the small-diameter portion 25 of the transfer shaft 24. That is, the first inner diameter portion 330 slidably supports the small-diameter portion 25 of the transfer shaft 24. The end portion of the first inner diameter portion 330 close to the plunger 31 (right side in FIG. 4) extends toward the plunger 31 on the radially inner side of the gap member 34 and overlaps with the gap member 34 in the radial direction. The end portion of the first inner diameter portion 330 close to the plunger 31 attracts the plunger 31 toward the second core 33 using the magnetic flux (referred to below as the magnet-induced flux as appropriate) passing through the permanent magnet 36, the yoke 37, the second core 33 (the flange portion 334, the second inner diameter portion 333, and the first inner diameter portion 330), the plunger 31, the first core 32, and the permanent magnet 36, so this end portion is referred to below as the attracting portion 331. Since the gap member 34 is disposed so as to include the second plane as described above, the attracting portion 331 overlapping with the gap member 34 in the radial direction is disposed in the middle in the axial direction of the coil 35 on the radially inner side of the coil 35.

The coil 35 has a terminal connected to a connector (not illustrated) attached to the yoke 37 as a case. Electric current is applied to the coil 35 from a power supply circuit controlled by an electronic control device or the like that controls the hydraulic pressure control device or from the auxiliary battery of a vehicle (not illustrated) via a connector. The permanent magnet 36 is formed in an annular shape and magnetized so that the radially outer side is the north pole and the radially inner side is the south pole. The yoke 37 is made of magnetic material such as iron and includes a cylindrical portion 370 shaped like a hollow cylinder and a holder supporting portion 371, extending toward the shaft holder 28 from the cylindrical portion 370, that holds the shaft holder 28 using the end surface of the second core 33 close to the shaft holder 28 (left side in FIG. 4). The holder supporting portion 371 is formed so as to cover the outer circumference of the outside flange portion 282 of the shaft holder 28 and the end surface on the left side in FIG. 4. As illustrated in FIG. 4, the spring 39 has a spring constant (rigidity) smaller than in the return spring 16 of the hydraulic pressure actuator 10. The spring 39 integrally biases the lock shaft 21, the transfer shaft 24, and the plunger 31 not fixed to each other toward the shaft holder 28 (left side in FIG. 4).

In the magnetic portion 30 configured in this way, when the coil 35 is not energized, the lock shaft 21, the transfer shaft 24, and the plunger 31 are biased toward the shaft holder 28 by the attraction force for attracting the plunger 31 based on magnet-induced flux by the attracting portion 331 and the elastic force of the spring 39. In addition, when the coil 35 is energized, the attraction of the plunger 31 by the attracting portion 331 is canceled by the magnetic flux (referred to below as the "cancellation flux" as appropriate), caused by the energization, that cancels the magnet-induced flux and only the elastic force of the spring 39 biases the lock shaft 21, the transfer shaft 24, and the plunger 31 toward the shaft holder 28. In the embodiment, the specifications of the magnetic portion 30 are determined so that, when the roller 13 of the piston rod 12 abuts against the second abutting surface 212 of the abutting portion 210 of the lock shaft 21, the sum of the attraction force for attracting the plunger 31 by the attracting portion 331 and the elastic force of the spring 39 is larger than the component force (referred to below as the "return spring component force" as appropriate) in the axial direction of the lock shaft 21 or the like of the force applied from the roller 13 to the second abutting surface 212 by the elastic force (downward force in FIGS. 2 and 4) of the return spring 16 and the elastic force of the spring 39 is smaller than the return spring component force. Accordingly, the lock shaft 21, the transfer shaft 24, and the plunger 31 are not moved toward the rear cap 38 by the return spring component force when the coil 35 is not energized, but they are integrally moved toward the rear cap 38 by the return spring component force when the coil 35 is energized.

In the embodiment, the maximum stroke amount (the distance between the end surface 316 of the plunger 31 and the inside bottom surface of the rear cap 38 in the example in FIG. 4) in the axial direction (left-right direction in FIG. 4) of the lock shaft 21, the transfer shaft 24, and the plunger 31 is set to a value smaller than the length in the axial direction of the second inner diameter portion 333 of the second core 33. In addition, as illustrated in FIG. 4, the large-diameter portion 23 of the lock shaft 21 and the large-diameter portion 26 of the transfer shaft 24 are positioned between the shaft holder 28 and the first inner diameter portion 330 in the axial direction of these shafts on the radially inner side of the second inner diameter portion 333. When the end surface 313 of the plunger 31 abuts against an end surface 332 of the attracting portion 331, the large-diameter portion 23 of the lock shaft 21 does not abut against the end surface of the shaft holder 28 close to the magnetic portion 30. Accordingly, when the lock shaft 21, the transfer shaft 24, and the plunger 31 are moved in the axial direction, it is possible to prevent the large-diameter portion 23 of the lock shaft 21 from abutting against the end surface of the shaft holder 28 close to the magnetic portion 30 or prevent the large-diameter portion 26 of the transfer shaft 24 from abutting against the end surface of the first inner diameter portion 330 of the second core 33 close to the shaft holder 28. Furthermore, the outer diameter of the large-diameter portion 23 of the lock shaft 21 is larger than the inner diameter of the inside flange portion 281 of the shaft holder 28 and the outer diameter of the large-diameter portion 26 of the transfer shaft 24 is larger than the inner diameter of the first cylindrical portion 330 of the second core 33. Accordingly, during assembly of the magnetic lock device 20 (for example, before disposing the plunger 31) or after assembly, it is possible to prevent the lock shaft 21 or the transfer shaft 24 from getting out of the shaft holder 28 to the left side in FIG. 4 or from getting out of the first cylindrical portion 330 to the right side in FIG. 4.

In the magnetic lock device 20 configured in this way, the lock shaft 21, the transfer shaft 24, and the plunger 31 are integrally biased toward the shaft holder 28 (left side in FIG. 4) by the attraction force for attracting the plunger 31 based on the magnet-induced flux by the attracting portion 331 and the elastic force of the spring 39 so that the end surface 313 of the plunger 31 abuts against the end surface 332 of the attracting portion 331 in the assembly state (the state in which assembly is completed).

In the embodiment, the transfer shaft 24 is made of non-magnetic material. Accordingly, as compared with the case in which the transfer shaft 24 is made of magnetic material, magnetic flux leakage of magnet-induced flux or cancellation flux through the transfer shaft 24 can be reduced and the magnetic efficiency can be improved. Furthermore, the shaft holder 28 is also made of non-magnetic material. Accordingly, magnetic flux leakage of magnet-induced flux and cancellation flux through the shaft holder 28 can also be reduced. In addition, the concave portion 310 is formed in the part of the plunger 31 close to the transfer shaft 24. Accordingly, as compared with the case in which the concave portion 310 is not formed, the difference in the area of the magnetic path between the attracting portion 331 and the part in the vicinity of the end surface 313 of the plunger 31 becomes smaller, so magnetic flux leakage can be suppressed between the attracting portion 331 and the plunger 31 (particularly, the vicinity of the end surface 313). Furthermore, the inner diameter of the concave portion 310 of the plunger 31 is set to a value larger than the inner diameter of the attracting portion 331. This can further suppress magnetic flux leakage between the attracting portion 331 and the plunger 31 (particularly, the vicinity of the end surface 313).

In addition, in the embodiment, the permanent magnet 36 of the magnetic portion 30 is disposed so as to surround the outer circumference of the right end portion in FIG. 4 of the first core 32. Accordingly, as compared with the case in which the permanent magnet 36 is disposed in a position (for example, the position of the attracting portion 331) in which the permanent magnet 36 faces the plunger 31 in the left-right direction in FIG. 4, it is possible to prevent the plunger 31 from abutting against the permanent magnet 36 when the plunger 31 is moved and protect the permanent magnet 36. Furthermore, the permanent magnet 36 is disposed on the opposite side of the shaft holder 28 across the coil 35 and magnetized in the radial direction. Accordingly, as compared with the magnet disposed in this position and magnetized in the axial direction, the length of the magnetic path of the magnetic circuit (the permanent magnet 36, the yoke 37, the second core 33, the plunger 31, the first core 32, and the permanent magnet 36) for forming magnet-induced flux (particularly the length in the left-right direction in FIG. 4) can be reduced.

The magnetic lock device 20 is mounted (fixed) to the case 11 of the hydraulic pressure actuator 10 so that the axial direction (up-down direction in FIGS. 1 and 2) of the piston rod 12 of the hydraulic pressure actuator 10 is orthogonal to the axial direction (left-right direction in FIGS. 1 and 2) of the lock shaft 21, the transfer shaft 24, and the plunger 31 of the magnetic lock device 20 and the abutting portion 210 of the lock shaft 21 can abut against the roller 13 in the hole 12h of the piston rod 12. Since the magnetic lock device 20 is mounted to the hydraulic pressure actuator 10 so that the axial direction of the piston rod 12 is orthogonal to the axial direction of the lock shaft 21 and the like as described above, as compared with the case in which they are disposed in a single line, the hydraulic pressure actuator 10 and the magnetic lock device 20 can be easily disposed in a restricted space inside or outside the transmission case. At this time, the abutting portion 210 of the lock shaft 21 overlaps with at least a part of the outer circumferential surface of the roller 13 and a first predetermined spacing is formed between both components as seen from the axial direction (up-down direction in FIG. 2) of the piston rod 12. This facilitates the mounting of the magnetic lock device 20 to the hydraulic pressure actuator 10 as compared with the case in which the first abutting surface 211 abuts against the roller 13 when the magnetic lock device 20 is mounted to the case 11 and the abutment moves the lock shaft 21 and the like toward the rear cap 38 (the lock shaft 21 and the like are moved toward the rear cap 38 against the sum of the attraction force for attracting the plunger 31 based on the magnet-induced flux by the attracting portion 331 and the elastic force of the spring 39).

In addition, when the magnetic lock device 20 is mounted to the case 11, the shaft holder 28 for housing the linear motion bearing 29 is fixed to the case 11 and the yoke 37 is fixed to the case 11 via a supporting member 50, as illustrated in FIG. 2. As described above, the shaft holder 28 is held by the yoke 37. When the coil 35 is not energized, the component force in the right direction (in FIGS. 2 and 4) of the force applied from the roller 13 to the abutting portion 210 when the roller 13 of the piston rod 12 abuts against the abutting portion 210 (the first abutting surface 211 and the second abutting surface 212) of the lock shaft 21 is applied to the holder supporting portion 371 of the yoke 37 via the lock shaft 21, the transfer shaft 24, the plunger 31, and the second core 33 (the first inner diameter portion 330, the second inner diameter portion 333, and the flange portion 334) having an attraction force with respect to the plunger 31, as is clear from FIGS. 2 and 4. Accordingly, when the yoke 37 is not fixed to the case 11 via the supporting member 50, an attempt is made to move the yoke 37 to the right side in FIGS. 2 and 4 and a relatively large force is applied to the part between the holder supporting portion 371 and the outside flange portion 282 of the shaft holder 28. In contrast, since the yoke 37 is fixed to the case 11 via the supporting member 50 in the embodiment, it is possible to prevent a large force from being applied to the part between the holder supporting portion 371 and the outside flange portion 282. As a result, the yoke 37 and the shaft holder 28 can be further protected. Furthermore, since the shaft holder 28 is held by the yoke 37 and the shaft holder 28 and the yoke 37 are fixed to the case 11 in the embodiment, the magnetic lock device 20 can be fixed to the case 11 more surely (more firmly).

Next, the operation of the parking device 1 and the magnetic lock device 20 according to the embodiment configured in this way will be described.

When the hydraulic pressure (working oil) from the hydraulic pressure control device is not supplied to the oil chamber 11f of the hydraulic pressure actuator 10 and the coil 35 of the magnetic portion 30 of the magnetic lock device 20 is not energized, the hydraulic pressure actuator 10 and the magnetic lock device 20 are put in the state illustrated in FIG. 2 and the rotary shaft of the transmission is locked (parking lock is made) by the parking device 1. At this time, in the hydraulic pressure actuator 10, the piston rod 12 is biased to the lock side (lower side in FIG. 2) by the elastic force of the return spring 16 and comes closest to or abuts against the bottom of the case 11. In addition, in the magnetic lock device 20, the attraction force for attracting the plunger 31 based on magnet-induced flux by the attracting portion 331 and the elastic force of the spring 39 integrally bias the lock shaft 21, the transfer shaft 24, and the plunger 31 toward the piston rod 12 (left side in FIG. 2), the end surface 313 of the plunger 31 abuts against the end surface 332 of the attracting portion 331 of the second core 33, and the abutting portion 210 of the lock shaft 21 is capable of abutting against the roller 13 in the hole 12h. In addition, the first predetermined spacing is formed between the first abutting surface 211 of the abutting portion 210 of the lock shaft 21 and the roller 13.

When a shift from the parking lock state to the parking lock release state is made to start traveling the vehicle, the supply of the hydraulic pressure (working oil) from the hydraulic pressure control device to the oil chamber 11f of the hydraulic pressure actuator 10 starts and energization to the coil 35 of the magnetic portion 30 starts. When energization to the coil 35 starts, the cancellation flux generated by the energization cancels the attraction of the plunger 31 performed by the attracting portion 331 of the second core 33. Accordingly, the lock shaft 21, the transfer shaft 24, and the plunger 31 are biased toward the piston rod 12 (left side in FIG. 2) only by the elastic force of the spring 39.

Figure 5:
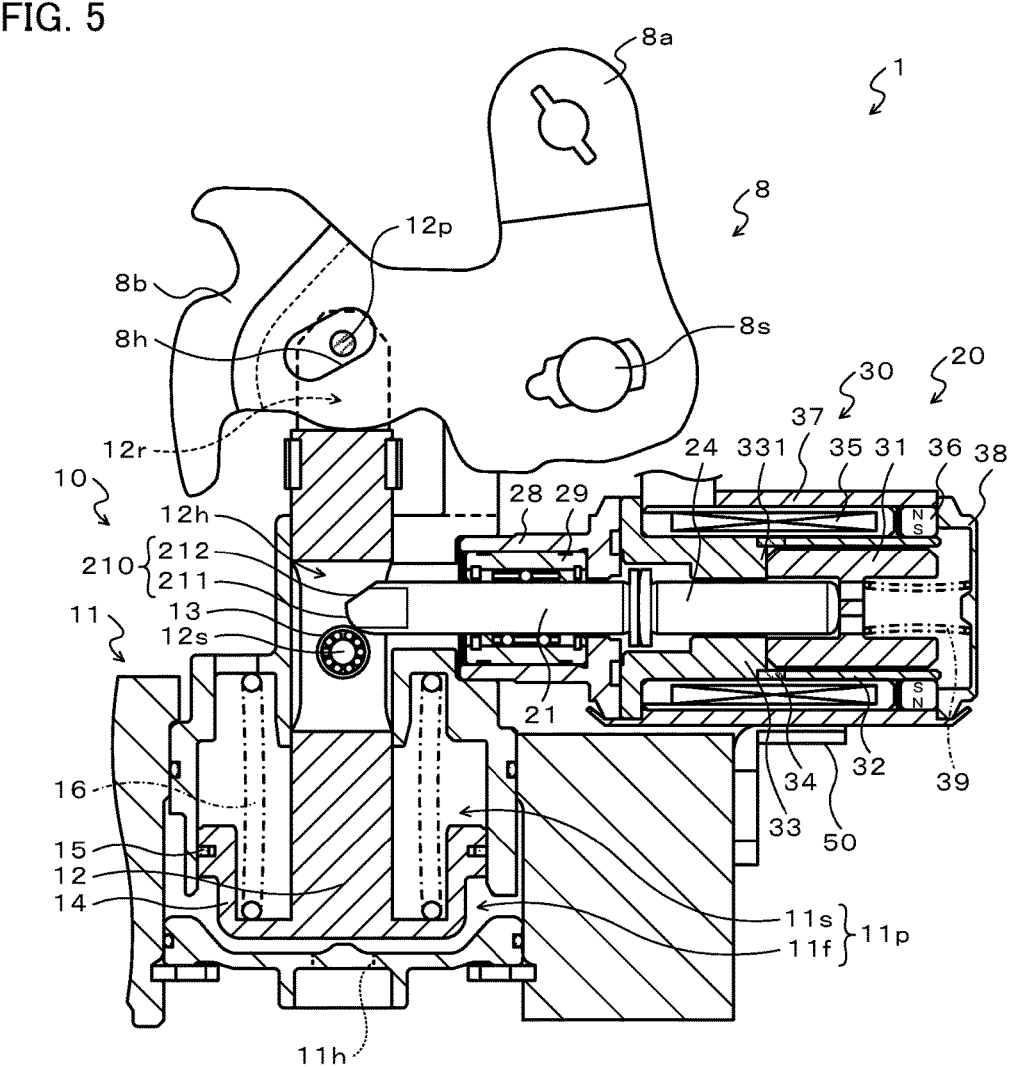
FIG. 5 is an explanatory diagram used to describe the operation of the parking device 1 and the magnetic lock device 20.

When the hydraulic pressure from the hydraulic pressure control device is supplied to the oil chamber 11f of the hydraulic pressure actuator 10, the piston rod 12 and the piston 14 are moved by the hydraulic pressure of the oil chamber 11f to the lock release side (upper side in FIG. 5) against the elastic force of the return spring 16 as illustrated in FIG. 5 and the roller 13 of the piston rod 12 abuts against the first abutting surface 211 of the abutting portion 210 of the lock shaft 21. At this time, in the lock shaft 21, the pressure reception portion of the first abutting surface 211 receiving a force from the roller 13 functions as the force applied point and the supported portion supported by the linear motion bearing 29 of the small-diameter portion 22 functions as the fulcrum or load point and these portions receive forces from the roller 13 and the linear motion bearing 29, respectively. Then, the roller 13 rolls on the first abutting surface 211 and a force (referred to below as the "first normal direction force" as appropriate) in a direction orthogonal to the normal line between the roller 13 and the first abutting surface 211 is thereby applied to the first abutting surface 211 from the roller 13. The component force (force toward the right side in FIG. 5) in the axial direction (of the lock shaft 21) of the first normal direction force causes the lock shaft 21, the transfer shaft 24, and the plunger 31 not fixed to each other to be integrally moved (moved toward the rear cap 38) away from the piston rod 12 against the elastic force of the spring 39.

Figure 6:
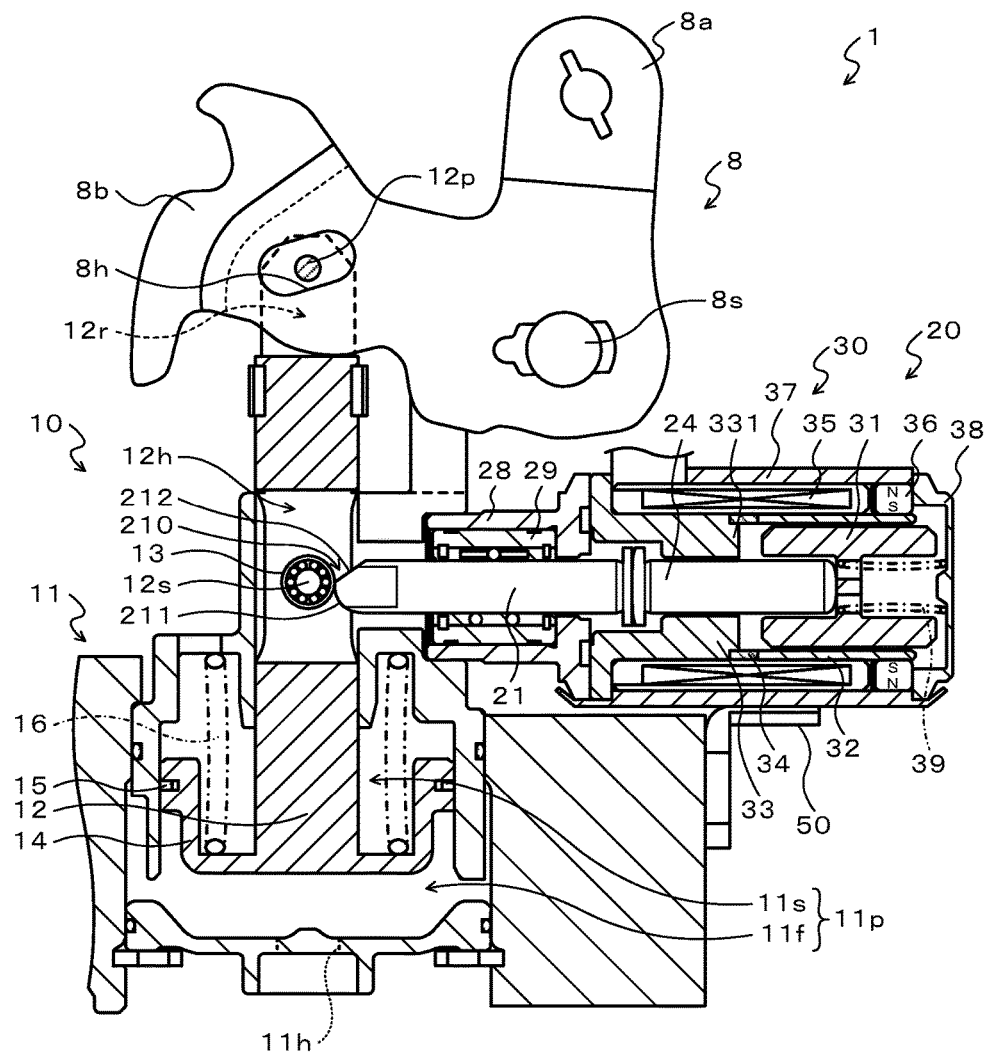
FIG. 6 is an explanatory diagram used to describe the operation of the parking device 1 and the magnetic lock device 20.
Figure 7:
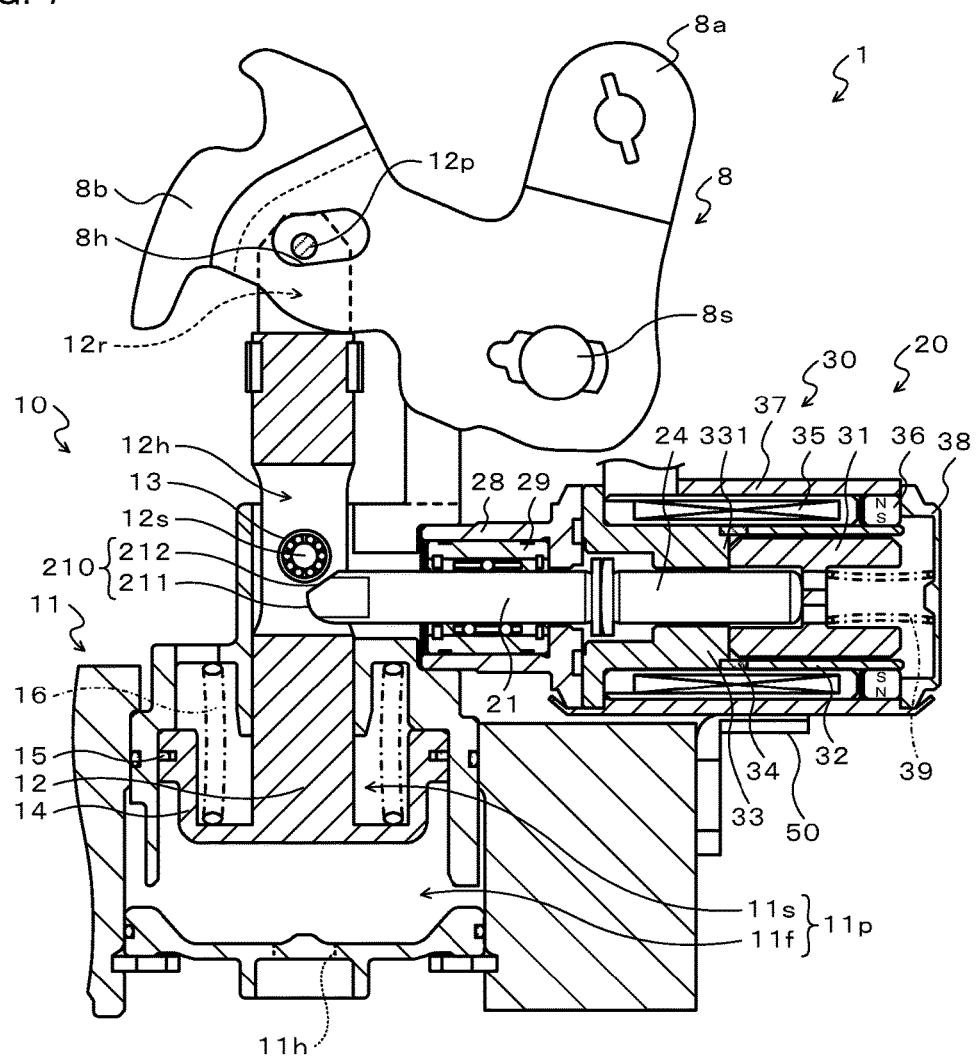
FIG. 7 is an explanatory diagram used to describe the operation of the parking device 1 and the magnetic lock device 20.

As illustrated in FIG. 6, when the piston rod 12 is moved to the lock release side and the abutment between the roller 13 and the first abutting surface 211 of the abutting portion 210 of the lock shaft 21 ends, the lock shaft 21, the transfer shaft 24, and the plunger 31 are moved by the elastic force of the spring 39 toward the piston rod 12 (left side in FIG. 6) and the roller 13 rolls on the second abutting surface 212. Since the roller 13 is moved to the lock release side (upper side in FIG. 6) together with the piston rod 12 at this time, a force for moving the lock shaft 21 and the like toward the rear cap 38 (right side in FIG. 6) from the roller 13 to the second abutting surface 212 is not basically applied. After that, the piston rod 12 is further moved by the hydraulic pressure to the lock release side and, as illustrated in FIG. 7, stops in a position in which a second predetermined spacing is formed between the roller 13 and the second abutting surface 212.

After the piston rod 12 starts moving to the lock release side by the hydraulic pressure until the piston rod 12 stops as described above, the detent lever 8 pivots clockwise in FIG. 1 about the spindle 8s and the parking rod 4 is moved to the right side in FIG. 1. The movement of the parking rod 4 releases the depression of the parking pawl 3 by the cam member 5 and the parking lock is released. When the parking lock release state is formed in this way, the energization to the coil 35 ends.

In the embodiment, when the piston rod 12 is moved to the lock release side by a hydraulic pressure, energization to the coil 35 of the magnetic portion 30 starts and the attraction of the plunger 31 by the attracting portion 331 of the second core 33 of the magnetic portion 30 is cancelled. Accordingly, as compared with the case in which the coil 35 is not energized (that is, the attraction of the plunger 31 by the attracting portion 331 is not cancelled), the lock shaft 21, the transfer shaft 24, and the plunger 31 can be moved away from the piston rod 12 (moved toward the rear cap 38) more easily. This can quickly move the piston rod 12 to the lock release side or reduce the hydraulic pressure for moving the piston rod 12 to the lock release side.

In addition, in the embodiment, the first abutting surface 211 receiving a force from the roller 13 when the piston rod 12 is moved to the lock release side by the hydraulic pressure has a curvature radius smaller than the radius (curvature radius) of the outer circumferential surface of the roller 13. Since this increases the component force in the axial direction (of the lock shaft 21) of the first normal direction force applied from the roller 13 to the lock shaft 21 when the piston rod 12 is moved to the lock release side, it is possible to suppress an increase in the hydraulic pressure to be supplied to the oil chamber 11$f$ of the hydraulic pressure actuator 10 when the parking lock is released.

In addition, in the embodiment, the roller 13 is rotatably supported by the piston rod 12 and, when the piston rod 12 is moved to the lock release side, the roller 13 rolls on the first abutting surface 211 or the second abutting surface 212. This reduces the friction resistance between the roller 13 and the first abutting surface 211 or the second abutting surface 212 and improves the wear resistance (durability) of them.

After the piston rod 12 is moved by the hydraulic pressure to the lock release side and the packing lock is released as illustrated in FIG. 7, when the hydraulic pressure from the hydraulic pressure control device is supplied to the oil chamber 11$f$ of the hydraulic pressure actuator 10, the parking lock release state can be kept. At this time, as described above, the second abutting surface 212 of the abutting portion 210 of the lock shaft 21 and the roller 13 of the piston rod 12 are distant from each other. In addition, energization to the coil 35 is not performed. Accordingly, in the magnetic lock device 20, the attraction force for attracting the plunger 31 based on magnet-induced flux by the attracting portion 331 and the elastic force of the spring 39 integrally bias the lock shaft 21, the transfer shaft 24, and the plunger 31 toward the piston rod 12 (left side in FIG. 7), the end surface 313 of the plunger 31 abuts against the end surface 332 of the attracting portion 331 of the second core 33, and the abutting portion 210 of the lock shaft 21 is capable of abutting against the roller 13 in the hole 12$h$. In addition, the second predetermined spacing is formed between the second abutting surface 212 of the abutting portion 210 of the lock shaft 21 and the roller 13.

Figure 8:
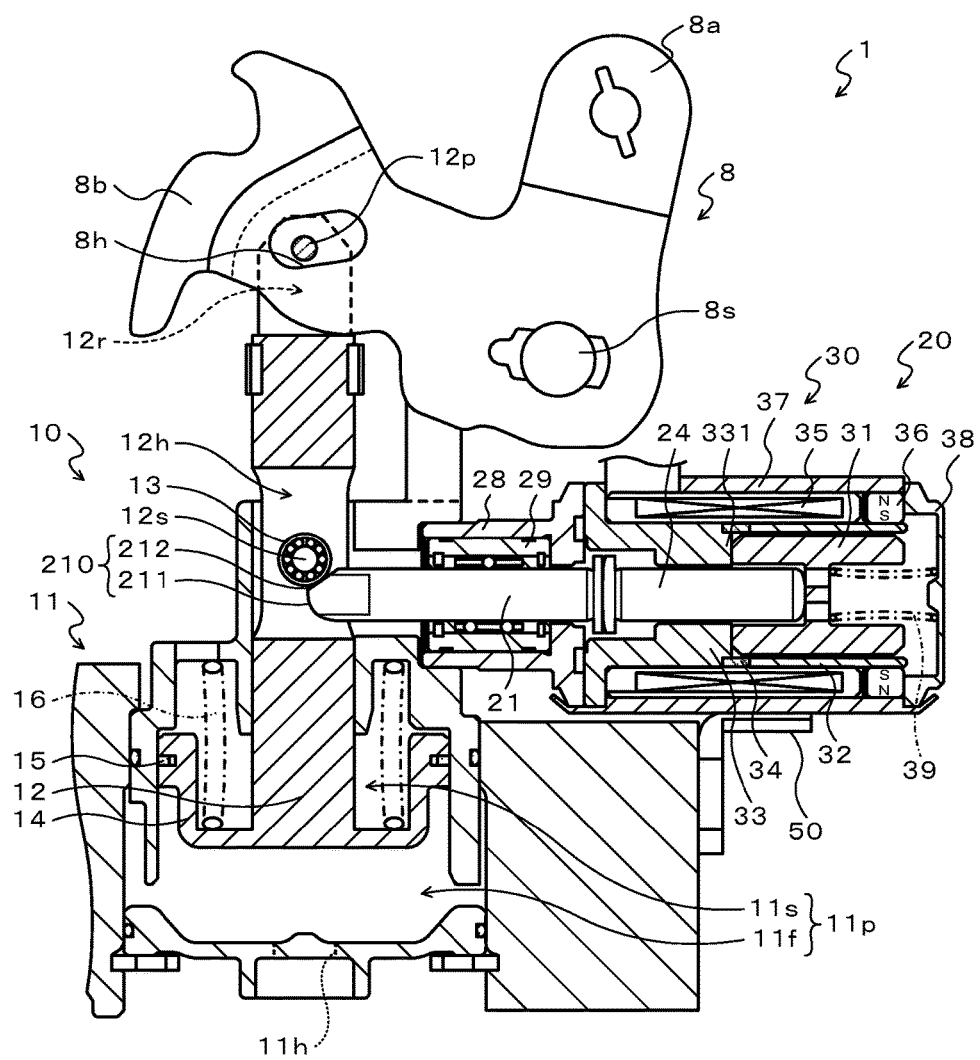
FIG. 8 is an explanatory diagram used to describe the operation of the parking device 1 and the magnetic lock device 20.

When the engine and the oil pump driven by the engine stop because of execution of an idling stop or the like in the parking lock release state in FIG. 7, the sufficient hydraulic pressure is not supplied from the hydraulic pressure control device to the oil chamber 11$f$ of the hydraulic pressure actuator 10, the piston rod 12 and the piston 14 are moved by the elastic force of the return spring 16 to the lock side (lower side in FIG. 8) as illustrated in FIG. 8, and the roller 13 of the piston rod 12 abuts against the second abutting surface 212 of the abutting portion 210 of the lock shaft 21. At this time, in the lock shaft 21, the pressure reception portion of the second abutting surface 212 receiving a force from the roller 13 functions as the force applied point and the supported portion supported by the linear motion bearing 29 of the small-diameter portion 22 functions as the fulcrum or load point and these portions receive forces from the roller 13 and the linear motion bearing 29, respectively.

Since the specifications of the magnetic portion 30 are determined in the embodiment so that the sum of the attraction force for attracting the plunger 31 based on magnet-induced flux by the attracting portion 331 and the elastic force of the spring 39 becomes larger than the above return spring component force as described above, it is possible to restrict the movement of the lock shaft 21 and the like away from the piston rod 12 and restrict the movement of the piston rod 12 to the lock side. As a result, even when the hydraulic pressure of the oil chamber 11$f$ of the hydraulic pressure actuator 10 is reduced because of execution of an idling stop or the like, the parking lock release state can be kept. Since electric current does not need to be applied to the coil 35 at this time, power consumption can be suppressed and, even when the coil 35 cannot be energized for any reason, the parking lock release state can be kept.

In addition, in the embodiment, the attracting portion 331 of the second core 33 of the magnetic portion 30 is disposed in the middle in the axial direction of the coil 35 on the radially inner side of the coil 35. On the radially inner side of the coil 35, magnet-induced flux and cancellation flux are more easily aligned with the axial direction in a position close to the vicinity of the middle than the vicinity of an end portion of the axial direction of the coil 35 (the magnetic flux density in the axial direction easily increases). Accordingly, when the attracting portion 331 is disposed at the center in the axial direction of the coil 35, as compared with the case in which the attracting portion 331 is disposed in a position (such as an end portion) other than the middle in the axial direction of the coil 35, it is possible to increase the attraction force for attracting the plunger 31 by the attracting portion 331 when the coil 35 is not energized while suppressing the upsizing of the device and restrict the movement in the axial direction of the lock shaft 21, the transfer shaft 24, and the plunger 31 more surely (with a larger force). As a result, it is possible to more surely restrict the movement of the piston rod 12 to the lock side when the roller 13 of the piston rod 12 abuts against the second abutting surface 212 of the abutting portion 210 of the lock shaft 21 while making the device compact. When the coil 35 is not energized (see FIGS. 7 and 8), the lock shaft 21, the transfer shaft 24, and the plunger 31 are integrally biased toward the shaft holder 28 by the attraction force for attracting the plunger 31 by the attracting portion 331 based on the magnet-induced flux and the elastic force of the spring 39 so that the end surface 313 of the plunger 31 abuts against the end surface 332 of the attracting portion 331. Accordingly, as compared with the case in which the end surface 332 of the attracting portion 331 does not abut against the end surface 313 of the plunger 31, the spacing between the attracting portion 331 and the plunger 31 can be reduced, so the attraction force for attracting the plunger 31 by the attracting portion 331 when the coil 35 is not energized can be further increased.

In addition, in the embodiment, the second abutting surface 212 of the abutting portion 210 of the lock shaft 21 is a (flat) oblique surface that is inclined at a certain angle to the lock release side toward the large-diameter portion 23 from the abutting portion 210. Accordingly, the force applied from the roller 13 to the second abutting surface 212 is constant regardless of the position at which the roller 13 abuts against the second abutting surface 212. As a result, since the attraction force for attracting the plunger 31 by the attracting portion 331 when the coil 35 is not energized does not need to be increased unnecessarily, the magnetic lock device 20 and therefore the parking device 1 can be prevented from being upsized unnecessarily.

When the energization of the coil 35 of the magnetic portion 30 starts in the parking lock release state in FIG. 7 or 8, the attraction of the plunger 31 by the attracting portion 331 of the second core 33 is cancelled by the cancellation flux generated by the energization. Accordingly, the lock shaft 21, the transfer shaft 24, and the plunger 31 are biased toward the piston rod 12 (left side in FIG. 2) only by the elastic force of the spring 39. When the hydraulic pressure from the hydraulic pressure control device to the oil chamber 11f of the hydraulic pressure actuator 10 is reduced while the coil 35 is energized, the working oil flows out of the oil chamber 11f via the oil hole 11h, the piston rod 12 and the piston 14 are moved to the lock side (lower side in FIG. 7) by the elastic force of the return spring 16 in the state in FIG. 7, and the roller 13 of the piston rod 12 abuts against the second abutting surface 212 of the abutting portion 210 of the lock shaft 21. In addition, in the state in FIG. 8, the roller 13 has already abutted against the second abutting surface 212. Then, the roller 13 rolls on the second abutting surface 212 and a force (referred to below as the "second normal direction force" as appropriate) in a direction orthogonal to the normal line between the roller 13 and the second abutting surface 212 is thereby applied from the roller 13 to the second abutting surface 212. The component force (the above return spring component force, which is the rightward force in FIGS. 7 and 8) in the axial direction (of the lock shaft 21) of the second normal direction force causes the lock shaft 21, the transfer shaft 24, and the plunger 31 not fixed to each other to be integrally moved (moved toward the rear cap 38) away from the piston rod 12 against the elastic force of the spring 39.

When the piston rod 12 is moved to the lock side and the abutment between the roller 13 and the second abutting surface 212 of the abutting portion 210 of the lock shaft 21 ends, the lock shaft 21, the transfer shaft 24, and the plunger 31 are moved by the elastic force of the spring 39 toward the piston rod 12 and the roller 13 rolls on the first abutting surface 211. Since the roller 13 is moved to the lock side together with the piston rod 12 at this time, a force for moving the lock shaft 21 and the like toward the rear cap 38 is not basically applied from the roller 13 to the first abutting surface 211. Then, the piston rod 12 is further moved to the lock side by the elastic force of the return spring 16 and stops in a position in which the first predetermined spacing is formed between the roller 13 and the first abutting surface 211 as illustrated in FIG. 2.

After the piston rod 12 starts moving to the lock side by the elastic force of the return spring 16 until the piston rod 12 stops as described above, the detent lever 8 pivots counterclockwise in FIG. 1 about the spindle 8s and the parking rod 4 is moved to the left side in FIG. 1. The movement of the parking rod 4 causes the cam member 5 biased by the cam spring 7 to push the parking pawl 3 so that the parking pawl 3 is engaged with the parking gear 2 to make a parking lock. When the parking lock state is entered in this way, the energization to the coil 35 ends.

Also when the piston rod 12 is moved to the lock side, the roller 13 rolls on the second abutting surface 212 or the first abutting surface 211 as in the movement to the lock release side. This reduces the friction resistance between the roller 13 and the second abutting surface 212 or the first abutting surface 211 and improves the wear resistance (durability) of them.

Since the lock shaft 21 of the magnetic lock device 20 is configured separately from the transfer shaft 24 in the embodiment, when these shafts are integrally moved in the axial direction, the transfer shaft 24 is moved in the axial direction on the radially inner side of the attracting portion 331 of the second core 33. Since the lock shaft 21 is configured separately from the transfer shaft 24, even if the lock shaft 21 rattles in the radial direction when, for example, the roller 13 of the piston rod 12 abuts against the first abutting surface 211 of the abutting portion 210 of the lock shaft 21 (see FIG. 5) or the roller 13 of the piston rod 12 abuts against the second abutting surface 212 of the abutting portion 210 of the lock shaft 21 (see FIG. 8), it is possible to prevent the rattle from being transferred to the transfer shaft 24 and prevent the transfer shaft 24 from rattling in the radial direction. Accordingly, as compared with the case in which the lock shaft 21 and the transfer shaft 24 are formed as one member, it is possible to reduce the clearance (clearance for sliding) between the outer circumference of the transfer shaft 24 and the inner circumference of the first inner diameter portion 330 including the attracting portion 331, that is, reduce the inner diameter of the inner circumferential surface of the first inner diameter portion 330. As a result, the magnetic efficiency of the magnetic lock device 20 can be improved and the magnetic lock device 20 can be made compact. Furthermore, the end surface 214 of the lock shaft 21 close to the transfer shaft 24 is a flat surface extending in a direction orthogonal to the axial direction of the lock shaft 21 and the end surface 240 of the transfer shaft 24 close to the lock shaft 21 is formed in a spherical surface projecting toward the lock shaft 21. In such a structure, since the end surface 214 of the lock shaft 21 abuts against the end surface 240 of the transfer shaft 24 via a relatively narrow range, even when the lock shaft 21 rattles in a radial direction, it is possible to further prevent the rattle from being transferred to the transfer shaft 24 and further prevent the transfer shaft 24 from rattling in a radial direction. As a result, the clearance between the outer circumference of the transfer shaft 24 and the inner circumference of the attracting portion 331 of the second core 33 can be reduced. In addition, the end surface 241 of the transfer shaft 24 close to the plunger 31 is formed in a spherical surface projecting toward the plunger 31 and the bottom surface 311 of the concave portion 310 of the plunger 31 is a flat surface extending in a direction orthogonal to the axial direction of the plunger 31. Accordingly, even if a slight rattle in the radial direction is transferred from the lock shaft 21 to the transfer shaft 24, it is possible to prevent the rattle from being transferred to the plunger 31 by absorbing the rattle using the transfer shaft 24 and further prevent the plunger 31 from rattling in the radial direction. As a result, the clearance between the plunger 31 and the first core 32 or the gap member 34 can be reduced. In addition, the inner diameter of the concave portion 310 of the plunger 31 close to the transfer shaft 24 is set to a value slightly larger than the outer diameter of the small-diameter portion 25 of the transfer shaft 24. Accordingly, even if the transfer shaft 24 rattles slightly in the radial direction, since the rattle can be absorbed by the clearance between the outer circumferential surface of the small-diameter portion 25 of the transfer shaft 24 and the inner circumferential surface of the concave portion 310, it is possible to further prevent the plunger 31 from rattling in the radial direction.

In addition, the lock shaft 21 of the magnetic lock device 20 is surface-hardened to improve the hardness in the embodiment. Accordingly, when the roller 13 of the piston rod 12 does not abut against the abutting portion 210 of the lock shaft 21, it is possible to prevent the small-diameter portion 22 of the lock shaft 21 from being deformed (for example, the surface is recessed) by a force received from the linear motion bearing 29 as compared with the case in which surface-hardening is not performed. In addition, when the roller 13 of the piston rod 12 abuts against the first abutting surface 211 of the abutting portion 210 of the lock shaft 21 (see FIG. 5), it is possible to prevent the first abutting surface 211 or the small-diameter portion 22 of the lock shaft 21 from being deformed (for example, the surface is recessed) by the force received from the roller 13 or the linear motion bearing 29. In addition, when the roller 13 of the piston rod 12 abuts against the second abutting surface 212 of the abutting portion 210 of the lock shaft 21 (see FIG. 8), it is possible to prevent the second abutting surface 212 or the small-diameter portion 22 of the lock shaft 21 from being deformed (for example, the surface is recessed) by the force received from the roller 13 or the linear motion bearing 29. As a result, the durability of the lock shaft 21 can be improved. When the roller 13 abuts against the abutting portion 210 (the first abutting surface 211 or the second abutting surface 212), since a force in a direction different from the left-right direction in FIG. 5 or 8 is applied from the roller 13 to the abutting portion 210, a larger force is applied from the linear motion bearing 29 to the small-diameter portion 22 of the lock shaft 21 than in the case in which the roller 13 does not abut against the abutting portion 210. Accordingly, it is important to improve the hardness of the small-diameter portion 22 against the abutment between the roller 13 and the abutting portion 210. In addition, as is clear from FIG. 5 and FIG. 8, the pressure reception portion (force applied point) of the abutting portion 210 (the first abutting surface 211 or the second abutting surface 212) receiving a force from the roller 13 is distant to some extent from the supported portion (the fulcrum or the load point) supported by the linear motion bearing 29 of the small-diameter portion 22, the force applied to the supported portion of the small-diameter portion 22 is basically larger than the force applied to the pressure reception portion of the abutting portion 210. Accordingly, improvement of the hardness of the small-diameter portion 22 is more important than improvement of the hardness of the abutting portion 210.

In addition, in the embodiment, the air hole 319 is formed in the plunger 31 of the magnetic lock device 20 so that the concave portion 310 communicates with the concave portion 315. Accordingly, it is possible to prevent the pressure of the space (the space formed by the plunger 31, the second core 33, and the shaft holder 28) between the plunger 31 and the shaft holder 28 from being changed when the plunger 31 is moved in the axial direction (see FIG. 6). Specifically, it is possible to prevent the pressure of the space between the plunger 31 and the shaft holder 28 from being reduced (to a negative pressure) as the plunger 31 is moved from the assembly state position (see FIG. 4) of the magnetic lock device 20 toward the rear cap 38 (see FIG. 6). This can make the movement of the lock shaft 21, the transfer shaft 24, and the plunger 31 toward the rear cap 38 smooth.

In the parking device 1 according to the embodiment described above, the lock shaft 21 of the magnetic lock device 20 is surface-hardened to improve the hardness. Accordingly, as compared with the case in which surface-hardening is not performed, it is possible to prevent the abutting portion 210 (the first abutting surface 211 or the second abutting surface 212) and the small-diameter portion 22 of the lock shaft 21 from being deformed (for example, the surface is recessed) by the force received from the roller 13 or the linear motion bearing 29 and improve the durability of the lock shaft 21.

In addition, the parking device 1 according to the embodiment, the transfer shaft 24 is made of non-magnetic material. Accordingly, as compared with the case in which the transfer shaft 24 is made of magnetic material, magnetic flux leakage of magnet-induced flux or cancellation flux through the transfer shaft 24 can be reduced and the magnetic efficiency of the magnetic lock device 20 can be further improved.

As a result, it is possible to improve the durability of the lock shaft 21 of the magnetic lock device 20 and improve the magnetic efficiency of the magnetic lock device 20 at the same time.

In addition, since the lock shaft 21 is configured separately from the transfer shaft 24, even if the lock shaft 21 rattles in the radial direction when, for example, the roller 13 of the piston rod 12 abuts against the first abutting surface 211 of the abutting portion 210 of the lock shaft 21 or the roller 13 abuts against the second abutting surface 212 of the abutting portion 210, it is possible to prevent the rattle from being transferred to the transfer shaft 24 and prevent the transfer shaft 24 from rattling in the radial direction. Accordingly, as compared with the case in which the lock shaft 21 and the transfer shaft 24 are formed as one member, it is possible to reduce the clearance between the outer circumference of the transfer shaft 24 and the inner circumference of the attracting portion 331, that is, reduce the inner diameter of the attracting portion 331.

Originally, in the parking device 1 of the embodiment, the hydraulic pressure actuator 10 and the magnetic lock device 20 are disposed so that the axial direction of the piston rod 12 of the hydraulic pressure actuator 10 is orthogonal to the axial direction of the lock shaft 21, the transfer shaft 24, and the plunger 31 of the magnetic lock device 20. This facilitates disposition in a restricted space as compared with the case in which both components are disposed (in a single shaft line) so as to move in a single direction.

In the parking device 1 according to the embodiment, the end surface 214 of the lock shaft 21 of the magnetic lock device 20 close to the transfer shaft 24 is a flat surface extending in a direction orthogonal to the axial direction of the lock shaft 21 and the end surface 240 of the transfer shaft 24 close to the lock shaft 21 is formed in a spherical surface projecting toward the lock shaft 21, and the end surface 241 of the transfer shaft 24 of the magnetic lock device 20 close to the plunger 31 is formed in a spherical surface projecting toward the plunger 31 and the bottom surface 311 of the concave portion 310 of the plunger 31 is a flat surface extending in a direction orthogonal to the axial direction of the plunger 31. However, the end surface 241 of the transfer shaft 24 close to the plunger 31 may be a flat surface extending in a direction orthogonal to the axial direction of the transfer shaft 24 and the bottom surface 311 of the concave portion 310 of the plunger 31 may be a flat surface extending in a direction orthogonal to the axial direction of the plunger 31.

In the parking device 1 according to the embodiment, the end surface 214 of the lock shaft 21 of the magnetic lock device 20 close to the transfer shaft 24 is a flat surface extending in a direction orthogonal to the axial direction of the lock shaft 21 and the end surface 240 of the transfer shaft 24 close to the lock shaft 21 is formed in a spherical surface projecting toward the lock shaft 21. However, the end surface 214 may be formed in a spherical surface projecting toward the transfer shaft 24 and the end surface 240 may be a flat surface extending in a direction orthogonal to the axial direction of the transfer shaft 24. In this case, preferably, the end surface 241 of the transfer shaft 24 close to the plunger 31 is a flat surface extending in a direction orthogonal to the axial direction of the transfer shaft 24 and the bottom surface 311 of the concave portion 310 of the plunger 31 is a flat surface extending in a direction orthogonal to the axial direction of the plunger 31, or the end surface 241 of the transfer shaft 24 close to the plunger 31 is a flat surface extending in a direction orthogonal to the axial direction of the transfer shaft 24 and the bottom surface 311 of the concave portion 310 of the plunger 31 is formed in a spherical surface projecting toward the transfer shaft 24.

In the parking device 1 according to the embodiment, the end surface 214 of the lock shaft 21 of the magnetic lock device 20 close to the transfer shaft 24 is a flat surface extending in a direction orthogonal to the axial direction of the lock shaft 21 and the end surface 240 of the transfer shaft 24 close to the lock shaft 21 is formed in a spherical surface projecting toward the lock shaft 21. However, the end surface 214 may be a flat surface extending in a direction orthogonal to the axial direction of the lock shaft 21 and the end surface 240 may be a flat surface extending in a direction orthogonal to the axial direction of the transfer shaft 24.

In the parking device 1 according to the embodiment, the inner diameter of the concave portion 310 of the plunger 31 of the magnetic portion 30 of the magnetic lock device 20 is set to a value larger than the inner diameter of the attracting portion 331. However, the inner diameter of the concave portion 310 may be set to a value equal to or slightly smaller than the inner diameter of the attracting portion 331.

Figure 9:
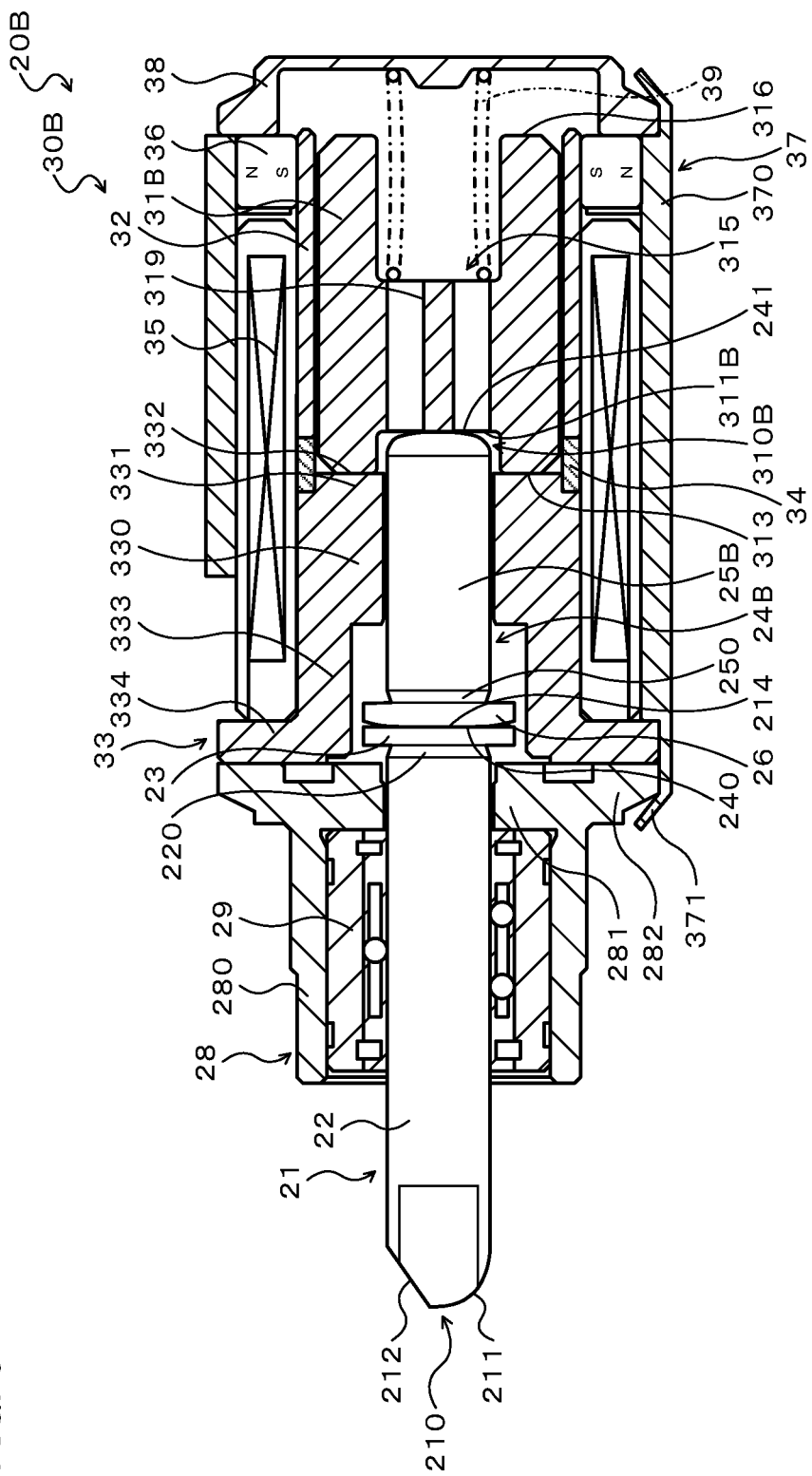
FIG. 9 is a structural diagram schematically illustrating the structure of a magnetic lock device 20B.
Figure 10:
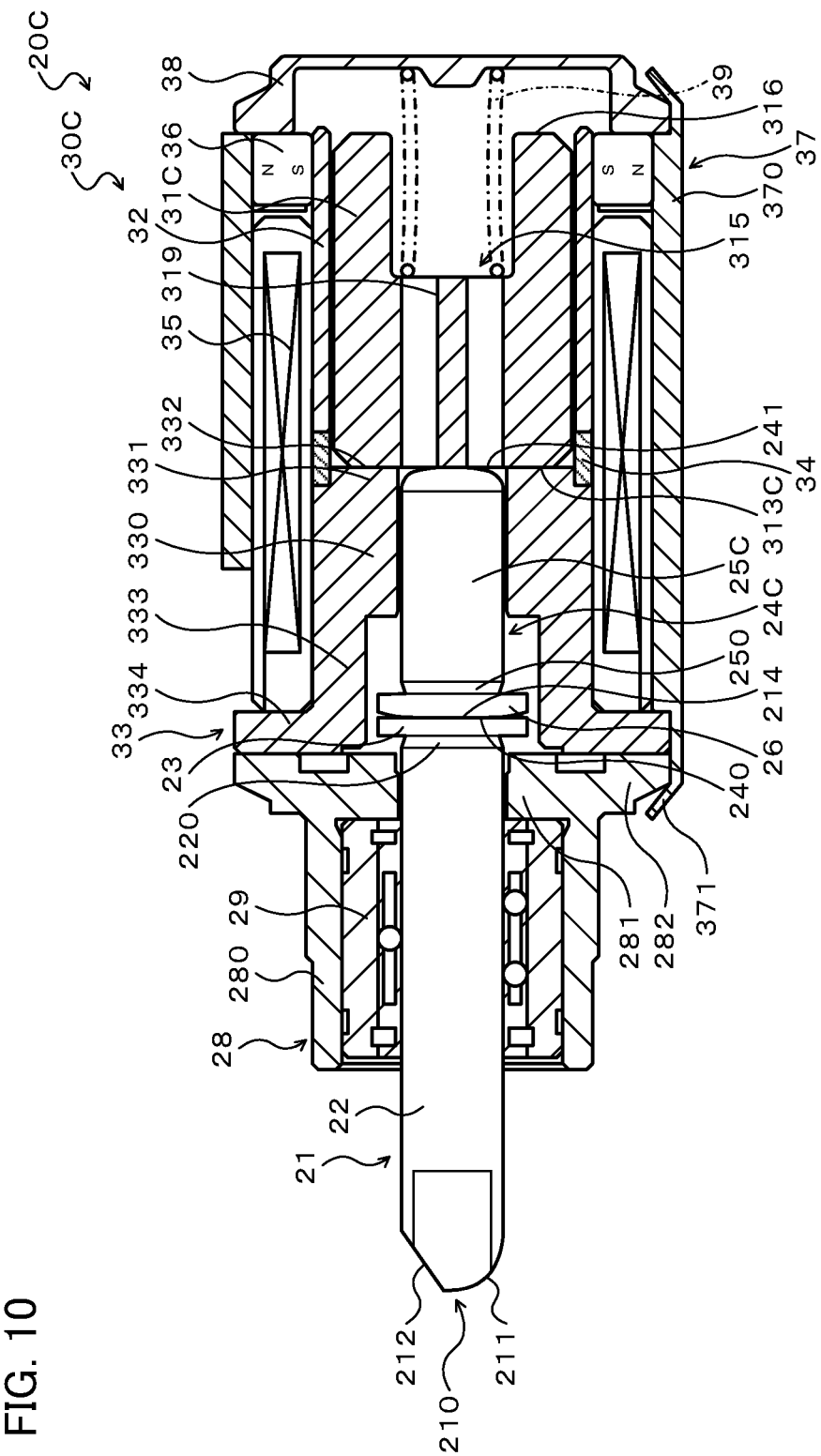
FIG. 10 is a structural diagram schematically illustrating the structure of a magnetic lock device 20C.

In the parking device 1 according to the embodiment, in the plunger 31 of the magnetic portion 30 of the magnetic lock device 20, the concave portion 310 close to the transfer shaft 24 and the concave portion 315 on the opposite side are formed to have the same shape. However, as illustrated in the magnetic lock device 20B in FIG. 9, in the plunger 31B of the magnetic portion 30B, the depth of the concave portion 310B may be set to a value smaller than the depth of the concave portion 315. In this case, a small-diameter portion 25B of the transfer shaft 24B is smaller in the length in the axial direction than the small-diameter portion 25 of the transfer shaft 24 of the magnetic lock device 20 by the length obtained by subtracting the depth of the concave portion 310B of the plunger 31B from the depth of the concave portion 310 of the plunger 31. The transfer shaft 24B is inserted into the concave portion 310B so that the end surface 241 of the small-diameter portion 25B abuts against the bottom surface 311B of the concave portion 310B, as in the magnetic portion 30 described above. In addition, as illustrated in the magnetic lock device 20C in FIG. 10, the plunger 31C of the magnetic portion 30C may not have the concave portion close to the transfer shaft 24C. In this case, a small-diameter portion 25C of the transfer shaft 24B is smaller in the length in the axial direction than the small-diameter portion 25 of the transfer shaft 24 of the magnetic lock device 20 by the length of the concave portion close to the transfer shaft 24C. In addition, in the transfer shaft 24C, the end surface 241 of the small-diameter portion 25C abuts against the end surface 313C of the plunger 31C close to the transfer shaft 24C.

In the parking device 1 according to the embodiment, the attracting portion 331 of the second core 33 of the magnetic portion 30 of the magnetic lock device 20 is disposed in the middle in the axial direction of the coil 35 on the radially inner side of the coil 35. However, the attracting portion 331 may be disposed in a position not in the middle in the axial direction of the coil 35 as long as the attracting portion 331 is disposed on the radially inner side of the coil 35 (that is, in a position facing the plunger 31 in the axial direction).

In the parking device 1 according to the embodiment, when the coil 35 of the magnetic portion 30 of the magnetic lock device 20 is not energized, the lock shaft 21, the transfer shaft 24, and the plunger 31 are integrally biased toward the shaft holder 28 by the attraction force for attracting the plunger 31 based on magnet-induced flux by the attracting portion 331 and the elastic force of the spring 39 so that the end surface 313 of the plunger 31 abuts against the end surface 332 of the attracting portion 331. However, a predetermined spacing may be formed between the end surface 313 of the plunger 31 and the end surface 332 of the attracting portion 331 (abutment is performed in any other position, for example, the end surface of the large-diameter portion 23 of the lock shaft 21 close to the small-diameter portion 22 abuts against the end surface of the shaft holder 28 close to the magnetic portion 30).

In the parking device 1 according to the embodiment, the permanent magnet 36 of the magnetic portion 30 of the magnetic lock device 20 is disposed on the radially outer side of the first core 32, However, the permanent magnet 36 may be disposed in a position facing the plunger 31 in the axial direction (for example, the position of the attracting portion 331).

Figure 11:
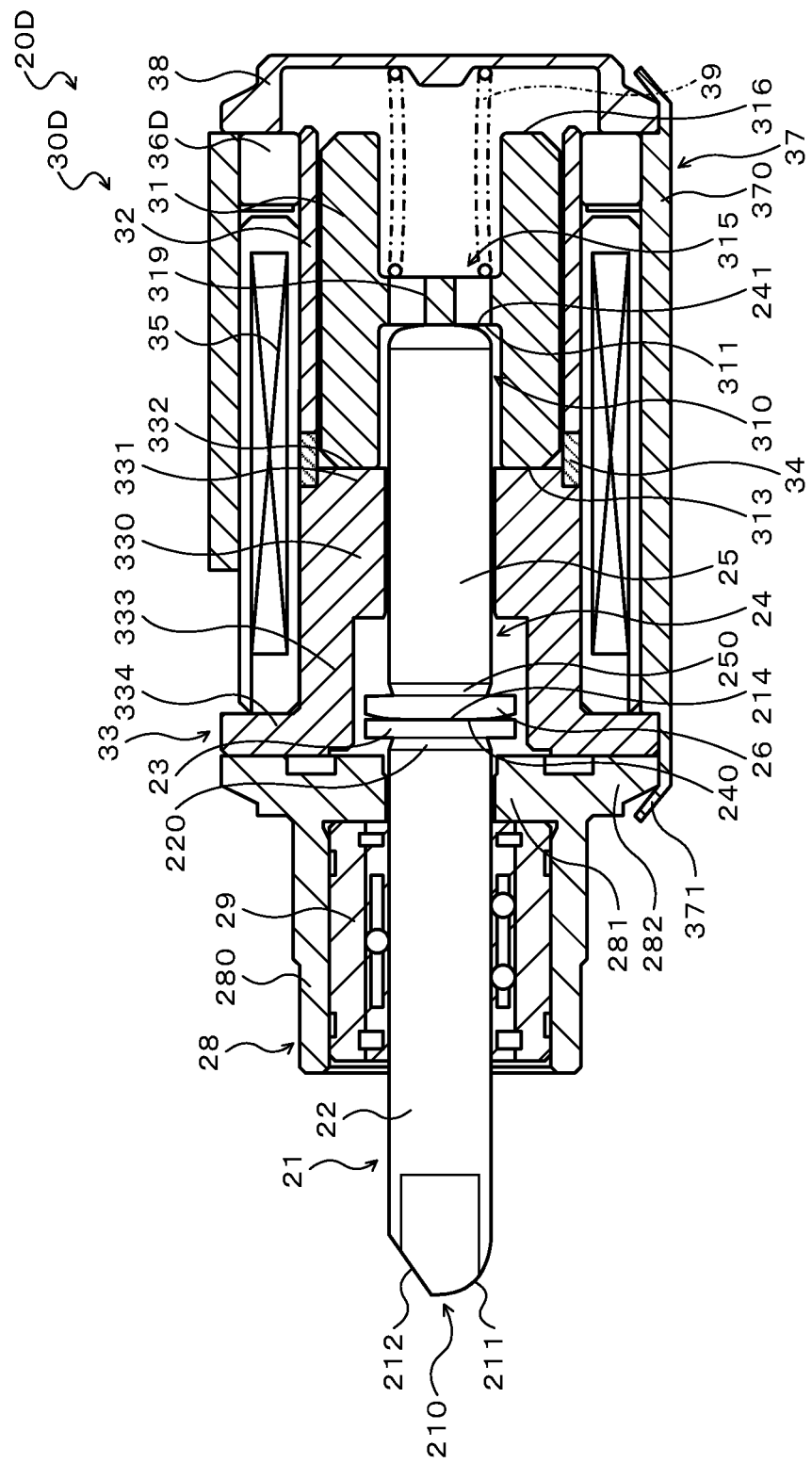
FIG. 11 is a structural diagram schematically illustrating the structure of a magnetic lock device 20D.

In the parking device 1 according to the embodiment, the permanent magnet 36 of the magnetic portion 30 of the magnetic lock device 20 is disposed in the position closer toward the rear cap 38 than the coil 35 on the radially outer side of the first core 32. However, as illustrated in the magnetic lock device 20D in FIG. 11, an annular ring 36D made of magnetic material may be disposed instead of the permanent magnet 36 in the position closer to the rear cap 38 than the coil 35 in the magnetic portion 30D on the radially outer side of the first core 32. In this case, when the coil 35 is not energized, the lock shaft 21, the transfer shaft 24, and the plunger 31 are integrally biased toward the shaft holder 28 (left side in FIG. 11) by the elastic force of the spring 39 so that the end surface 313 of the plunger 31 abuts against the end surface 332 of the attracting portion 331 of the second core 33. When the coil 35 is energized, the plunger 31 is attracted and locked to the second core 33 (left side in FIG. 4) by the attraction force for attracting the plunger 31 by the attracting portion 331 of the second core 33 based on the magnetic flux passing through the yoke 37, the second core 33 (the flange portion 334, the second inner diameter portion 333, and the first inner diameter portion 330), the plunger 31, the first core 32, the ring 36D, and the yoke 37 and the elastic force of the spring 39.

In the magnetic lock device 20D, as in the magnetic lock device 20, the attracting portion 331 of the second core 33 of the magnetic portion 30D is disposed in the middle in the axial direction of the coil 35 on the radially inner side of the coil 35. Accordingly, the attraction force for attracting the plunger 31 by the attracting portion 331 when the coil 35 is not energized can be increased. Before energization to the coil 35 starts, the lock shaft 21, the transfer shaft 24, and the plunger 31 are integrally biased toward the shaft holder 28 so that the end surface 313 of the plunger 31 abuts against the end surface 332 of the attracting portion 331 by the elastic force of the spring 39. Accordingly, as compared with the case in which the end surface 332 of the attracting portion 331 does not abut against the end surface 313 of the plunger 31, the spacing between the attracting portion 331 and the plunger 31 can be reduced, so the attraction force for attracting the plunger 31 by the attracting portion 331 when the coil 35 is energized can be further increased.

In addition, in the magnetic lock device 20D, the ring 36D is disposed in the same position as in the magnetic lock device 20 in which the permanent magnet 36 is disposed. However, the annular flange portion may extend to the radially outer side from the right end portion of the first core 32 or the annular flange portion may extend to the radially inner side from the vicinity of the right end portion of the yoke 37.

In the parking device 1 according to the embodiment, when the magnetic lock device 20 is mounted to the hydraulic pressure actuator 10, the first abutting surface 211 of the abutting portion 210 of the lock shaft 21 does not abut against the roller 13. However, the first abutting surface 211 may abut against the roller 13, the lock shaft 21, the transfer shaft 24, and the plunger 31 may be thereby moved integrally toward the rear cap 38, and a space may be formed between the end surface 313 of the plunger 31 and the end surface 332 of the attracting portion 331 of the second core 33. In this case, the first abutting surface 211 abuts against the roller 13 in the parking lock state. This can reduce the amount of movement stroke of the piston rod 12 when the piston rod 12 is moved to the lock release side by the hydraulic pressure and make a quick shift from the parking lock state to the parking lock release state. In addition, it is possible to improve the durability of the lock shaft 21 and the roller 13 and prevent the generation of noise and shock by preventing a collision between the roller 13 and the first abutting surface 211 when the piston rod 12 is moved to the lock release side by the hydraulic pressure.

In the parking device 1 according to the embodiment, the first abutting surface 211 (the abutting surface on the lock side) of the abutting portion 210 of the lock shaft 21 is a curved surface projecting to the lock side and having an arc-shaped cross section. However, the first abutting surface 211 may be a curved surface projecting to the lock side and having a non-arc-shaped cross sectional shape or may be a (flat) oblique surface inclined at a constant angle to the lock side toward the large-diameter portion 23 from the abutting portion 210.

In the parking device 1 according to the embodiment, the second abutting surface 212 (the abutting surface on the lock release side) of the abutting portion 210 of the lock shaft 21 is a (flat) oblique surface inclined at a constant angle to the lock release side. However, the second abutting surface 212 may be a curved surface having a cross sectional shape (for example, arc-shaped cross section) projecting to the lock release side.

Figure 12:
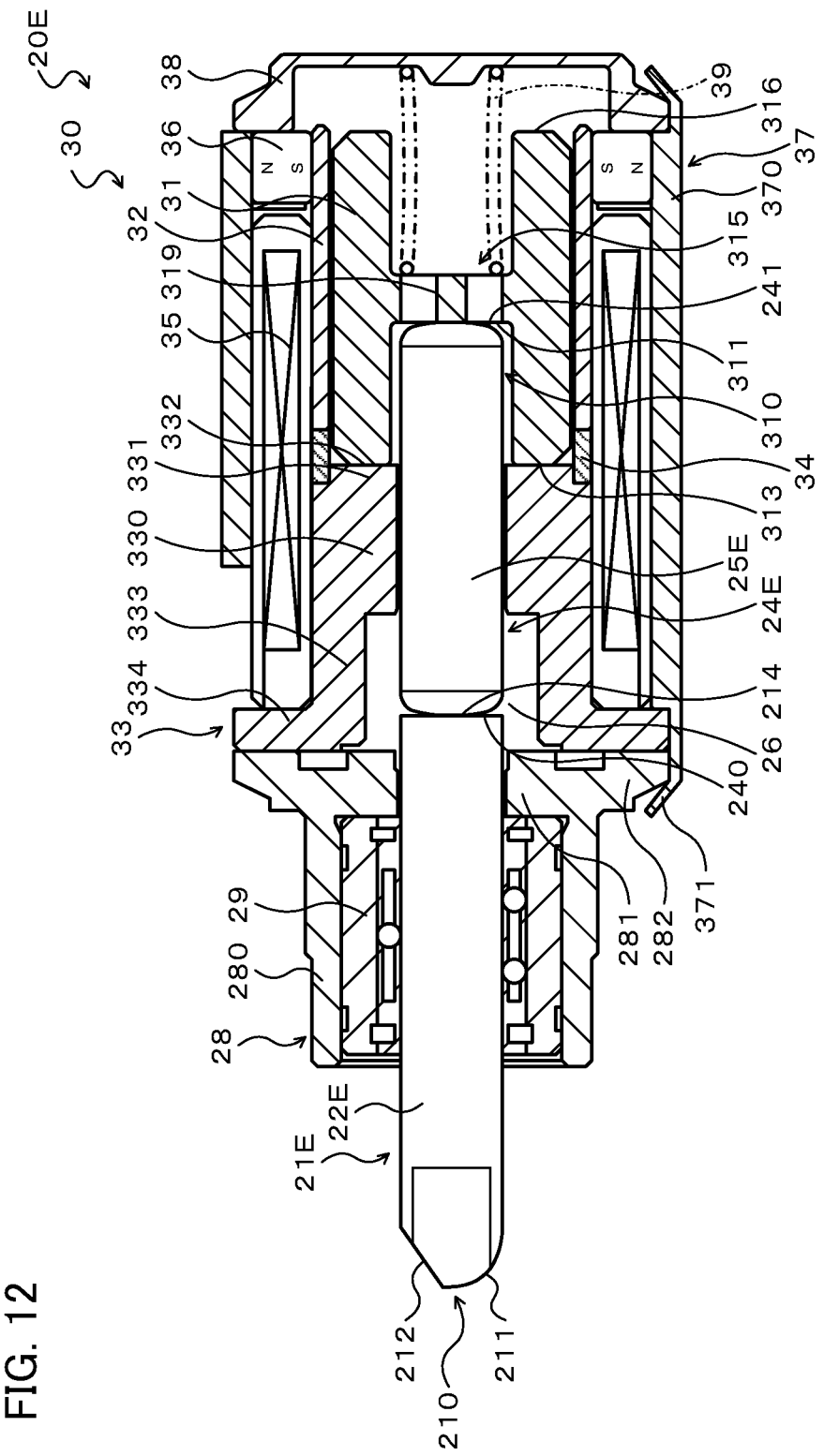
FIG. 12 is a structural diagram schematically illustrating the structure of a magnetic lock device 20E.

In the parking device 1 according to the embodiment, the lock shaft 21 of the magnetic lock device 20 has the small-diameter portion 22 and the large-diameter portion 23 and the transfer shaft 24 has the small-diameter portion 25 and the large-diameter portion 26. However, as illustrated in the magnetic lock device 20E in FIG. 12, the lock shaft 21E may have only the small-diameter portion 22E without having the large-diameter portion and the transfer shaft 24E may have only the small-diameter portion 25E without having the large-diameter portion.

Although the shaft holder 28 is made of non-magnetic material in the parking device 1 according to the embodiment, the shaft holder 28 may be made of magnetic material.

In the parking device 1 according to the embodiment, the roller 13 rotatably supported by the support shaft 12s supported by the piston rod 12 is used as the abutted portion of the piston rod 12. However, a cylindrical body rotatably supported by the piston rod 12 may be used or a component (for example, a component similar to the support shaft 12s) unrotatably configured with respect to the piston rod 12 may be used.

In the parking device 1 according to the disclosure, the piston rod 12 is biased to the lock side by the elastic force of the return spring 16 and moved to the lock release side by the hydraulic pressure against the elastic force of the return spring 16. However, the piston rod 12 may be biased to the lock release side by the elastic force of the return spring and may be moved to the lock side by the hydraulic pressure against the elastic force of the return spring.

Although the piston rod 12 is moved to the lock side by the elastic force of the return spring 16 to make a shift from the parking lock release state to the parking lock state in the parking device 1 according to the embodiment, the hydraulic pressure (working oil) from the hydraulic pressure control device may be supplied to the spring chamber 11s of the hydraulic pressure actuator 10 to make the shift. In this way, the piston rod 12 can be moved to the lock side more quickly by the elastic force of the return spring 16 and the hydraulic pressure of the spring chamber 11s.

In the parking device 1 according to the embodiment, when a shift from the parking lock state to the parking lock release state is made, the piston rod 12 is moved to the lock release side by the hydraulic pressure while the attraction of the plunger 31 by the attracting portion 331 of the second core 33 is cancelled by energizing the coil 35 of the magnetic portion 30. However, the piston rod 12 may be moved to the lock release side by the hydraulic pressure without energizing the coil 35. In this case, although the power consumption can be reduced as compared with the case in which the coil 35 is energized, a larger hydraulic pressure is necessary to move the piston rod 12 to the lock release side.

According to the embodiment, there is provided a magnetic lock device (20, 20B, 20C, 20D, 20E) including an abutting portion (210) capable of abutting against an abutted portion (13) provided on a moving member (12) reciprocating in a first direction and a movement restricting member (21, 21E, 24, 24B, 24C, 24E) reciprocating in a second direction orthogonal to the first direction, in which the movement restricting member (21, 21E, 24, 24B, 24C, 24E) is locked by a magnetic force so as to restrict movement of the moving member (12) in the first direction when the abutting portion (210) abuts against the abutted portion (13), the magnetic lock device (20, 20B, 20C, 20D, 20E) including a magnetic portion (30, 30B, 30C, 30D) including a plunger (31), made of a magnetic material, the plunger reciprocating in the second direction, and an attracting portion (331) attracting the plunger (31, 31B, 31C) toward the moving member (12) using a magnetic force and locking the plunger (31, 31B, 31C) and a bearing (29) slidably supporting the movement restricting member (21, 21E, 24, 24B, 24C, 24E), In which the movement restricting member (21, 21E, 24, 24B, 24C, 24E) includes a first member (21, 21E) having the abutting portion (210) and a second member (24, 24B, 24C, 24E) formed separately from the first member (21, 21E), the first member (21, 21E), the second member (24, 24B, 24C, 24E), and the plunger (31, 31B, 31C) are disposed in this order in the second direction from the moving member (12), the first member (21, 21E) supported by the bearing (29) is surface-hardened for hardening at least the surface of the first member (21, 21E), and the second member (24, 24B, 24C, 24E) is made of non-magnetic material.

In the magnetic lock device (20, 20B, 20C, 20D, 20E) according to the disclosure, the movement restricting member (21, 21E, 24, 24B, 24C, 24E) includes the first member (21, 21E) having the abutting portion (210) and the second member (24, 24B, 24C, 24E) formed separately from the first member (21, 21E) and the first member (21, 21E), the second member (24, 24B, 24C, 24E), and the plunger (31, 31B, 31C) are disposed in this order in the second direction from the moving member (12).

In this magnetic lock device (20, 20B, 20C, 20D, 20E), the attracting portion (331) attracts the plunger (31, 31B, 31C) toward the moving member (12) using a magnetic force and locks the plunger (31, 31B, 31C), so as to restrict the movement in the second direction of the first member (21, 21E), the second member (24, 24B, 24C, 24E), and the plunger (31, 31B, 31C) and restrict the movement in the first direction of the moving member (12) when the abutted portion (13) of the moving member (12) abuts against the abutting portion (210) of the first member (21, 21E) of the movement restricting member (21, 21E, 24, 24B, 24C, 24E).

Since the first member (21, 21E) is surface-hardened, it is possible to suppress deformation (such as depression in the surface) of the first member (21, 21E) due to a force applied from the bearing (29) and a force applied from the abutted portion (13) to the abutting portion (210) when the abutted portion (13) abuts against the abutting portion (210), thereby improving the durability of the first member (21, 21E). When the abutted portion (13) abuts against the abutting portion (210), a force in a direction different from the movement direction (second direction) of the first member (21, 21E) and the second member (24, 24B, 24C, 24E) is applied from the abutted portion (13) to the abutting portion (210). Accordingly, a larger force is applied from the bearing (29) to the first member (21, 21E) than in the case in which the abutted portion (13) does not abut against the abutting portion (210). Accordingly, it is important to improve the hardness of the first member (21, 21E) against the abutment between the abutted portion (13) and the abutting portion (210). "Surface-hardening" is, for example, quenching. In addition, since the second member (24, 24B, 24C, 24E) is made of non-magnetic material, it is possible to prevent magnetic flux leakage due to the second member (24, 24B, 24C, 24E) and improve the magnetic efficiency of the magnetic lock device (20, 20B, 20C, 20D, 20E). As a result, it is possible to improve the durability of the first member (21, 21E) of the magnetic lock device (20, 20B, 20C, 20D, 20E) and improve the magnetic efficiency of the magnetic lock device (20, 20B, 20C, 20D, 20E) at the same time.

In the magnetic lock device (20, 20B, 20C, 20E) according to the disclosure, the magnetic portion (30, 30B, 30C) may have a permanent magnet (36) causing the attracting portion (331) to perform attraction of the plunger (31, 31B, 31C) and locking the plunger (31, 31B, 31C) and the magnetic portion (30, 30B, 30C) may energize a coil (35) and cancel the attraction of the plunger (31, 31B, 31C) by the attracting portion (331). In this case, when the coil (35) is not energized, the attracting portion (331) attracts the plunger (31, 31B, 31C) using the permanent magnet (36) and locks the plunger (31, 31B, 31C), so that movement in the second direction of the first member (21, 21E), the second member (24, 24B, 24C, 24E), and the plunger (31, 31B, 31C) can be restricted to restrict movement in the first direction of the moving member (12) when the abutted portion (13) of the moving member (12) abuts against the abutting portion (210) of the first member (21, 21E). Accordingly, when movement of the moving member (12) in the first direction is restricted, the coil (35) does not need to be energized, thereby suppressing electric power consumption.

In the magnetic lock device (20, 20B, 20C, 20E) according to the aspect of the disclosure, the permanent magnet (36) may be disposed in a position not aligned in the second direction with the plunger (31, 31B, 31C). This can prevent the plunger (31, 31B, 31C) from abutting against permanent magnet (36) and protect the permanent magnet (36).

In the magnetic lock device (20, 20B, 20C, 20D, 20E) according to the disclosure, the second member (24, 24B, 24C, 24E) may include the attracting portion (331) and may be slidably supported by a cylindrical portion (33) extending in the second direction. In this case, as described above, if the first member (21, 21E) is formed separately from the second member (24, 24B, 24C, 24E), the clearance (clearance used by the cylindrical portion to slidably support the second member) between the outer circumference of the second member (24, 24B, 24C, 24E) and the inner circumference of the cylindrical portion (330) can be reduced.

In the magnetic lock device (20, 20B, 20C, 20D, 20E) according to the disclosure, one of an abutting surface (214) of the first member (21, 21E) through which the first member (21, 21E) abuts against the second member (24, 24B, 24C, 24E) and an abutting surface (240) of the second member (24, 24B, 24C, 24E) through which the second member (24, 24B, 24C, 24E) abuts against the first member (21, 21E) may be a flat surface orthogonal to the second direction and the other of the abutting surfaces (214) and the abutting surface (240) may be formed in a spherical surface projecting toward the one of the abutting surfaces (214) and the abutting surface (240). In such a structure, since both members abut against each other via a relatively narrow range, even when the first member (21, 21E) rattles in a radial direction (such as the first direction), it is possible to further prevent the rattle from being transferred to the second member (24, 24B, 24C, 24E).

In the magnetic lock device (20, 20B, 20C, 20D, 20E) according to the aspect of the disclosure, the abutting surface (214) of the first member (21, 21E) through which the first member (21, 21E) abuts against the second member (24, 24B, 24C, 24E) may be a flat surface extending in a direction orthogonal to the second direction, the abutting surface (240) of the second member (24, 24B, 24C, 24E) through which the second member (24, 24B, 24C, 24E) abuts against the first member (21, 21E) may be formed in a spherical surface projecting toward the first member (21, 21E), an abutting surface (241) of the second member (24, 24B, 24C, 24E) through which the second member (24, 24B, 24C, 24E) abuts against the plunger (31, 31B, 31C) may be formed in a spherical surface projecting toward the plunger (31, 31B, 31C), and an abutting surface (311, 311B, 313C) of the plunger (31, 31B, 31C) through which the plunger (31, 31B, 31C) abuts against the second member (24, 24B, 24C, 24E) may be a flat surface extending in a direction orthogonal to the second direction.

In the magnetic lock device (20, 20B, 20C, 20D, 20E) according to the disclosure, the attracting portion (331) may face, in the second direction, a least a part of an end portion of the plunger (31, 31B), the end portion being close to the attracting portion (331), and the plunger (31, 31B) may have a concave portion (310, 310B) into which the second member (24, 24B, 24E) is inserted.

In the magnetic lock device (20, 20B, 20C, 20D, 20E) according to the disclosure, the bearing (29) may be a linear motion bearing (29).

In the magnetic lock device (20, 20B, 20C, 20D, 20E) according to the disclosure, the magnetic portion (30, 30B, 30C, 30D) has an elastic member (39) biasing the plunger (31, 31B, 31C) toward the moving member (12) using an elastic force and the movement restricting member (21, 21E, 24, 24B, 24C, 24E) and the plunger (31, 31B, 31C) may be integrally biased toward the moving member (12) by the elastic member (39) so that the abutting portion (210) is capable of abutting against the abutted portion (13).

The parking device (1) according to the disclosure has the magnetic lock device (20, 20B, 20C, 20D, 20E) according to any one of the above aspects of the disclosure in which the rotary shaft of a transmission is locked or the locked rotary shaft is released by reciprocation in the first direction of the moving member (12), in which the moving member (12) is moved in the first direction to a lock side for locking the rotary shaft or a lock release side for releasing the locked rotary shaft by the elastic force of the second elastic member (16) or a hydraulic pressure.

The parking device (1) according to the disclosure includes the magnetic lock device (20, 20B, 20C, 20D, 20E) according to any one of the above aspects of the disclosure. Accordingly, it is possible to obtain the same effect as in the magnetic lock device according to the disclosure, such as, for example, the effect of improving the durability of the first member (21, 21E) of the magnetic lock device (20, 20B, 20C, 20D, 20E) and improving the magnetic efficiency of the magnetic lock device (20, 20B, 20C, 20D, 20E) at the same time. The moving member (12) and the movement restricting member (21, 21E, 24, 24B, 24C, 24E) are disposed so that the moving member (12) and the movement restricting member (21, 21E, 24, 24B, 24C, 24E) are moved in directions orthogonal to each other. This facilitates disposition in a restricted space as compared with the case in which both members are disposed (in a single shaft line) so as to move in a single direction.

In the parking device (1) according to the disclosure, the abutting portion (210) has a lock release side abutting surface (212) receiving a force from the abutted portion (13) when the moving member (12) is moved to the lock side and the lock release side abutting surface (212) is inclined to the lock release side toward a base end portion from an end portion of the movement restricting member (21, 21E, 24, 24B, 24C, 24E). In this configuration, if the abutted portion (13) abuts against the lock release side abutting surface (212) when the moving member (12) is moved to the lock side, the component force in the second direction of the force applied from the abutted portion (13) to the lock release side abutting surface (212) can integrally move the movement restricting member (21, 21E, 24, 24B, 24C, 24E) and the plunger (31, 31B, 31C) away from the moving member.

In the parking device (1) according to the disclosure, the abutting portion (210) has a lock side abutting surface (211) receiving a force from the abutted portion (13) when the moving member (12) is moved to the lock release side and the lock side abutting surface (211) is inclined to the lock side toward the base end portion from the end portion of the movement restricting member (21, 21E, 24, 24B, 24C, 24E). In this configuration, if the abutted portion (13) abuts against the lock side abutting surface (211) when the moving member (12) moves to the lock release side, the component force in the second direction of the force applied from the abutted portion (13) to the lock side abutting surface (211) can integrally move the movement restricting member (21, 21E, 24, 24B, 24C, 24E) and the plunger away from the moving member (12).

In the parking device (1) according to the disclosure, when locking the plunger (31, 31B, 31C) using a magnetic force, the magnetic lock device (20, 20B, 20C, 20D, 20E) does not allow the movement restricting member (21, 21E, 24, 24B, 24C, 24E) and the plunger (31, 31B, 31C) to be moved away from the moving member (12) by a force applied from the abutted portion (13) to the abutting portion (210) by the elastic force of the second elastic member (16) and, when not locking the plunger (31, 31B, 31C) using a magnetic force, the magnetic lock device (20, 20B, 20C, 20D, 20E) allows the movement restricting member (21, 21E, 24, 24B, 24C, 24E) and the plunger (31, 31B, 31C) to be moved away from the moving member (12) by a force applied from the abutted portion (13) to the abutting portion (210) by the elastic force of the second elastic member (16).

In the parking device (1) according to the disclosure, the abutted portion (13) may be configured as the roller (13) rotatable with respect to the moving member (12). In this configuration, the friction resistance between the abutted portion (13) of the moving member (12) and the abutting portion (210) of the movement restricting member (21, 21E, 24, 24B, 24C, 24E) can be reduced and the wear resistance (durability) of both members can be improved.

In the parking device (1) according to the disclosure, the moving member (12) may be provided with a hole (12h) penetrating through the moving member (12), the abutting portion (210) of the movement restricting member (21, 21E, 24, 24B, 24C, 24E) being capable of entering the hole (12h), and the abutting portion (210) may be positioned in the hole (12h).

In the parking device (1) according to the disclosure, the moving member (12) may be biased to the lock side by the elastic force of the second elastic member (16) and the moving member (12) may be moved to the lock release side by a hydraulic pressure against the elastic force of the second elastic member (16).

The correspondence between the main components of the embodiment and the main components of the invention described in Summary of Invention will be described. In the embodiment, the lock shaft 21 and the transfer shaft 24 correspond to the "movement restricting member", the magnetic portion 30 including the plunger 31, the first core 32, the second core 33 (the attracting portion 331), the gap member 34, the coil 35, the permanent magnet 36, the yoke 37, and the spring 39 corresponds to the "magnetic portion", and the linear motion bearing 29 corresponds to the "bearing".

The correspondence between main components of the embodiment and the main components of the invention described in Summary of Invention does not limit the components of the invention described in Summary of Invention since the embodiment is an example (described in Summary of Invention) for specifically describing Description of Embodiments. That is, the interpretation of the invention described in Summary of Invention needs to be performed based on the descriptions in Summary of Invention and the embodiment is only a specific example of the invention described in Summary of Invention.

Although an embodiment of the disclosure has been described above, the disclosure is not limited to the embodiment and it will be appreciated that the disclosure may be practiced in various other forms without departing from the inventive concept.

INDUSTRIAL APPLICABILITY

The disclosure is applicable to manufacturing industry for magnetic lock devices and parking devices.

The invention claimed is:
1. A magnetic lock device including an abutting portion capable of abutting against an abutted portion provided on a moving member reciprocating in a first direction and a movement restricting member reciprocating in a second direction orthogonal to the first direction, wherein the move- ment restricting member is locked by a magnetic force so as to restrict movement of the moving member in the first direction by abutting the abutting portion and the abutted portion, the magnetic lock device comprising:
a magnetic portion including a plunger that is made of a magnetic material and configured to reciprocate in the second direction, and an attracting portion attracting the plunger toward the moving member using a magnetic force and locking the plunger; and
a bearing slidably supporting the movement restricting member,
wherein the movement restricting member includes a first member having the abutting portion and a second member formed separately from the first member,
the first member, the second member, and the plunger are disposed in this order in the second direction from the moving member,
the first member supported by the bearing is surface-hardened for hardening at least a surface of the first member, and
the second member is made of non-magnetic material.

2. The magnetic lock device according to claim 1,
wherein the magnetic portion has a permanent magnet causing the attracting portion to perform attraction of the plunger and locking the plunger and the magnetic portion energizes a coil and cancels the attraction of the plunger by the attracting portion.

3. The magnetic lock device according to claim 2,
wherein the permanent magnet is disposed in a position not aligned in the second direction with the plunger.

4. The magnetic lock device according to claim 3,
wherein the second member is slidably supported by a cylindrical portion extending in the second direction, the cylindrical portion including the attracting portion.

5. The magnetic lock device according claim 4,
wherein one of an abutting surface of the first member through which the first member abuts against the second member and an abutting surface of the second member through which the second member abuts against the first member is a flat surface extending in a direction orthogonal to the second direction and the other of the abutting surfaces is formed in a spherical surface projecting toward the one of the abutting surfaces.

6. The magnetic lock device according to claim 5,
wherein the abutting surface of the first member through which the first member abuts against the second member is a flat surface extending in a direction orthogonal to the second direction,
the abutting surface of the second member through which the second member abuts against the first member is formed in a spherical surface projecting toward the first member,
an abutting surface of the second member through which the second member abuts against the plunger is formed in a spherical surface projecting toward the plunger, and
an abutting surface of the plunger through which the plunger abuts against the second member is a flat surface extending in the direction orthogonal to the second direction.

7. The magnetic lock device according to claim 6,
wherein the attracting portion faces, in the second direction, a least a part of an end portion of the plunger, the end portion being close to the attracting portion, and the plunger has a concave portion into which the second member is inserted.

8. The magnetic lock device according to claim 7,
wherein the bearing is a linear motion bearing.

9. The magnetic lock device according to claim 8,
wherein the magnetic portion has an elastic member biasing the plunger toward the moving member using an elastic force and
the movement restricting member and the plunger are biased integrally toward the moving member by the elastic member so that the abutting portion is capable of abutting against the abutted portion.

10. A parking device including the magnetic lock device according to claim 9, wherein a rotary shaft of a transmission is locked or the locked rotary shaft is released by reciprocation in the first direction of the moving member,
wherein the moving member is moved in the first direction to a lock side for locking the rotary shaft or a lock release side for releasing the locked rotary shaft by an elastic force of a second elastic member or a hydraulic pressure.

11. The parking device according to claim 10,
wherein the abutting portion has a lock release side abutting surface receiving a force from the abutted portion when the moving member is moved to the lock side and
the lock release side abutting surface is inclined to the lock release side toward a base end portion from an end portion of the movement restricting member.

12. The parking device according to claim 11,
wherein the abutting portion has a lock side abutting surface receiving a force from the abutted portion when the moving member is moved to the lock release side and
the lock side abutting surface is inclined to the lock side toward the base end portion from the end portion of the movement restricting member.

13. The parking device according to claim 12,
wherein, when locking the plunger using a magnetic force, the magnetic lock device does not allow the movement restricting member and the plunger to be moved away from the moving member by a force applied from the abutted portion to the abutting portion by the elastic force of the second elastic member and,
when not locking the plunger using a magnetic force, the magnetic lock device allows the movement restricting member and the plunger to integrally be moved away from the moving member by a force applied from the abutted portion to the abutting portion by the elastic force of the second elastic member.

14. The parking device according to claim 13,
wherein the abutted portion is configured as a roller rotatable with respect to the moving member.

15. The parking device according to claim 14,
wherein the moving member is provided with a hole penetrating through the moving member, the abutting portion of the movement restricting member being capable of entering the hole, and
the abutting portion is positioned in the hole.

16. The parking device according to claim 15,
wherein the moving member is biased to the lock side by the elastic force of the second elastic member and the moving member is moved to the lock release side by a hydraulic pressure against the elastic force of the second elastic member.

17. The magnetic lock device according to claim 1,
wherein one of an abutting surface of the first member through which the first member abuts against the second member and an abutting surface of the second member through which the second member abuts against the first member is a flat surface extending in a direction orthogonal to the second direction and the other of the abutting surfaces is formed in a spherical surface projecting toward the one of the abutting surfaces.

18. The magnetic lock device according to claim 17, wherein the abutting surface of the first member through which the first member abuts against the second member is a flat surface extending in a direction orthogonal to the second direction, the abutting surface of the second member through which the second member abuts against the first member is formed in a spherical surface projecting toward the first member, an abutting surface of the second member through which the second member abuts against the plunger is formed in a spherical surface projecting toward the plunger, and an abutting surface of the plunger through which the plunger abuts against the second member is a flat surface extending in the direction orthogonal to the second direction.

19. The magnetic lock device according to claim 1, wherein the bearing is a linear motion bearing.

* * * * *